United States Patent
Singh et al.

(10) Patent No.: US 10,967,295 B2
(45) Date of Patent: Apr. 6, 2021

(54) PROCESSES FOR REMOVING REACTIVE SOLVENT FROM LITHIUM BIS(FLUOROSULFONYL)IMIDE (LIFSI) USING ORGANIC SOLVENTS THAT ARE STABLE TOWARD ANODES IN LITHIUM-ION AND LITHIUM-METAL BATTERIES

(71) Applicant: SES Holdings Pte. Ltd., Singapore (SG)

(72) Inventors: Rajendra P. Singh, Woburn, MA (US); Qichao Hu, Arlington, MA (US)

(73) Assignee: SES Holdings Pte. Ltd., Singapore (SG)

( * ) Notice: Subject to any disclaimer, the term of this patent is extended or adjusted under 35 U.S.C. 154(b) by 0 days.

(21) Appl. No.: 16/685,601

(22) Filed: Nov. 15, 2019

(65) Prior Publication Data

US 2020/0155964 A1 May 21, 2020

Related U.S. Application Data

(63) Continuation-in-part of application No. 16/570,262, filed on Sep. 13, 2019.
(Continued)

(51) Int. Cl.
*B01D 11/04* (2006.01)
*C01B 21/086* (2006.01)
(Continued)

(52) U.S. Cl.
CPC ........ *B01D 11/0492* (2013.01); *C01B 21/086* (2013.01); *H01G 11/62* (2013.01);
(Continued)

(58) Field of Classification Search
CPC ........... B01D 11/0288; B01D 11/0492; B01D 12/00; C01B 21/086; H01G 11/06;
(Continued)

(56) References Cited

U.S. PATENT DOCUMENTS 7,919,629 B2 4/2011 Michot
8,377,406 B1 2/2013 Singh et al.
(Continued)

FOREIGN PATENT DOCUMENTS

CN 106976849 A 7/2017
WO 2007025361 A1 3/2007
(Continued)

OTHER PUBLICATIONS

Rolf Appel, Gerhard Eisenhauer, Chemische Berichte, 1962, pp. 246-248.
(Continued)

*Primary Examiner* — Ngoc-Yen Nguyen
(74) *Attorney, Agent, or Firm* — Downs Rachlin Martin PLLC

(57) ABSTRACT

Methods for making high-purity LiFSI salts and intermediate products using one, the other, or both of a reactive-solvent removal/replacement method and an LiFSI purification method. In some embodiments, the reactive-solvent removal/replacement method includes using non-reactive anhydrous organic solvents to remove and/or replace one or more reactive solvents in a crude LiFSI. In some embodiments, the LiFSI purification method includes using anhydrous organic solvents to remove impurities, such as synthesis impurities, from a crude LiFSI. In some embodiments, crude LiFSI can be made using an aqueous-based neutralization process. LiFSI salts and products made using meth-
(Continued)

ods of the disclosure are also described, as are uses of such salts and products and electrochemical devices that include such salts and products.

30 Claims, 4 Drawing Sheets

Related U.S. Application Data

(60) Provisional application No. 62/883,177, filed on Aug. 6, 2019, provisional application No. 62/883,178, filed on Aug. 6, 2019, provisional application No. 62/840,949, filed on Apr. 30, 2019, provisional application No. 62/768,447, filed on Nov. 16, 2018.

(51) Int. Cl.
  *H01G 11/84* (2013.01)
  *H01G 11/62* (2013.01)
  *H01M 10/0568* (2010.01)

(52) U.S. Cl.
  CPC .......... *H01G 11/84* (2013.01); *C01P 2006/40* (2013.01); *H01M 10/0568* (2013.01)

(58) Field of Classification Search
  CPC ........ H01G 11/58; H01G 11/62; H01G 11/84; H01M 10/0568
  See application file for complete search history.

(56) References Cited

U.S. PATENT DOCUMENTS

| | | |
|---|---|---|
| 8,580,220 B2 | 11/2013 | Honda et al. |
| 8,722,005 B1 | 5/2014 | Poshusta et al. |
| 2004/0058008 A1* | 3/2004 | Tarcha ................. A61K 9/0019 424/490 |
| 2009/0105502 A1* | 4/2009 | Umemoto ............. C07C 303/10 562/829 |
| 2012/0041233 A1 | 2/2012 | Sato et al. |
| 2018/0219260 A1* | 8/2018 | Poshusta .......... H01M 10/0569 |
| 2019/0292053 A1* | 9/2019 | Schmidt ................ C01B 21/086 |

FOREIGN PATENT DOCUMENTS

| | | | |
|---|---|---|---|
| WO | 2017090877 A1 | 6/2017 | |
| WO | 2018104674 A1 | 6/2018 | |
| WO | WO-2018104675 A1 * | 6/2018 | ......... C01B 21/0935 |
| WO | 2018157240 A1 | 9/2018 | |

OTHER PUBLICATIONS

John K. Ruff and Max Lustig; Inorganic Syntheses, 1967, vol. 11, pp. 138-143.
B. Krumm, A. Vij, R.L. Kirchmeier, J. M. Shreeve, Inorganic Chemistry, 1998, 37, pp. 6295-6303.
Martin Beran, Jiri Prihoda, Zdirad Zak, Milos Cemik, Polyhedron, 2006, 25, pp. 1292-1298.
Martin Beran and Jiri Prihoda; A New Method of the Preparation of Imido-bis(sulfuric acid) Dihalogenide, (F,Cl), and the Potassium Salt of Imido-bis(sulfuric acid) Difluoride; Z. Anorg. Allg. Chem. 2005, 631, pp. 55-59.
International Search Report and Written Opinion dated Feb. 26, 2020 in connection with PCT/IB2019/059852, filed Nov. 15, 2019.

* cited by examiner

US 10,967,295 B2

PROCESSES FOR REMOVING REACTIVE SOLVENT FROM LITHIUM BIS(FLUOROSULFONYL)IMIDE (LIFSI) USING ORGANIC SOLVENTS THAT ARE STABLE TOWARD ANODES IN LITHIUM-ION AND LITHIUM-METAL BATTERIES

RELATED APPLICATION DATA

This application is a continuation-in-part of U.S. Nonprovisional application Ser. No. 16/570,262, filed Sep. 13, 2019, and titled "PURIFIED LITHIUM BIS(FLUOROSULFONYL)IMIDE (LiFSI) PRODUCTS, METHODS OF PURIFYING CRUDE LiFSI, AND USES OF PURIFIED LiFSI PRODUCTS", which is incorporated herein by reference in its entirety. This application also claims the benefit of priority of the following applications, each of which is incorporated herein by reference in its entirety:

- U.S. Provisional Patent Application Ser. No. 62/883,177, filed Aug. 6, 2019, and titled "PROCESS FOR PRODUCING ULTRAPURE LITHIUM BIS(FLUOROSULFONYL) IMIDE (LiFSI) FOR LITHIUM METAL ANODE BATTERIES APPLICATIONS";
- U.S. Provisional Patent Application Ser. No. 62/883,178, filed Aug. 6, 2019, and titled "PROCESS FOR REMOVING REACTIVE SOLVENT FROM LITHIUM BIS(FLUOROSULFONYL)IMIDE (LIFSI) USING ORGANIC SOLVENTS THAT ARE STABLE TOWARD ANODES IN LITHIUM-ION AND LITHIUM-METAL BATTERIES";
- U.S. Provisional Patent Application Ser. No. 62/840,949, filed Apr. 30, 2019, and titled "PROCESS FOR REMOVING PROTIC SOLVENTS FROM LITHIUM BIS(FLUORO-SULFONYL)IMIDE (LiFSI)"; and
- U.S. Provisional Patent Application Ser. No. 62/768,447, filed Nov. 16, 2018, and titled "PROCESS FOR THE PURIFICATION OF LITHIUM BIS(FLUOROSULFONYL)IMIDE (LiFSI)".

FIELD OF THE INVENTION

The present invention generally relates to the field of lithium sulfonimide salts for electrolytes for lithium-based electrochemical devices. In particular, the present invention is directed to processes for removing reactive solvent from lithium bis(fluorosulfonyl)imide (LiFSI) using organic solvents that are stable toward anodes in lithium-ion and lithium-metal batteries.

BACKGROUND

Lithium bis(fluorosulfonyl)imide (LiFSI) has been reported as a conducting salt for lithium-based batteries due to its desirable physicochemical and electrochemical properties. LiFSI has a melting point of 143° C. and is thermally stable up to 200° C. It exhibits far superior stability towards hydrolysis compared to lithium hexafluorophosphate ($LiPF_6$), which is a salt commonly used for electrolytes in lithium-ion batteries. LiFSI has aroused intensive interest as an electrolyte/additive in lithium-ion batteries due to its unique properties, such as excellent solubility, ionic conductivity comparable to $LiPF_6$-based electrolytes, cost-effectiveness, environmental benignity, and favorable solid electrolyte interface (SEI) forming property. The level of purity of LiFSI used for battery electrolytes can be critical to the operation and cycle life of the batteries using LiFSI-based electrolytes. However, many commercial processes for synthesizing LiFSI produce byproducts that remain is the crude LiFSI produced by the synthesis processes. The main synthesis impurities in LiFSI are lithium fluoride (LiF), lithium chloride (LiCl), lithium sulfate ($Li_2SO_4$), lithium fluorosulfonate ($LiFSO_3$), and acidic-type impurities, for example, hydrogen fluoride (HF). These impurities must be removed, or reduced to various acceptable levels, before using LiFSI salt in a battery. However, they can be challenging to remove.

Some processes for removing impurities from crude LiFSI, such as the synthesis impurities noted above, utilize one or more solvents, such as alcohol(s) and water, that are reactive to lithium metal. In addition, crude LiFSI may contain water by mean other than being a solvent. Thus, even if such LiFSI is purified to a point that levels of the target synthesis impurities are low enough that they do not interfere with the functioning of the electrochemical device when the purified LiFSI is deployed in the device's electrolyte, this purified LiFSI can still unsuitable for use in secondary lithium-metal batteries. This is so because the purified LiFSI contains residue(s) of the reactive solvent(s) used to remove the target impurities and/or water that may be otherwise present, and the reactive-solvent residue and/or water react with the lithium metal of the device's anode, thereby destroying the integrity of the lithium metal and the ability of the anode to function properly. Over time, even relatively small amounts of reactive-solvent(s) in the LiFSI salt used to make the electrolyte can significantly impact the performance and cycle life of a secondary lithium-metal battery.

What is needed is an ultrapure LiFSI salt that has not only very low levels of synthesis impurities but also very low levels of reactive solvent(s).

SUMMARY OF THE DISCLOSURE

In an implementation, the present disclosure is directed to a method of creating a reduced-reactive-solvent lithium bis(fluorosulfonyl) imide (LiFSI) product. The method includes providing a first crude LiFSI containing LiFSI and one or more reactive solvents; contacting the first crude LiFSI with at least one first anhydrous organic solvent under an inert condition to create a solution containing the first crude LiFSI and the one or more reactive solvents, wherein the solubility of the LiFSI in the at least one first anhydrous organic solvent is at least about 35% below 25° C.; subjecting the solution to a vacuum so as to remove the at least one first anhydrous organic solvent and the one or more reactive solvents and obtain a solid mass; treating the solid mass with at least one second anhydrous organic solvent in which the LiFSI is insoluble to create a combination having an insoluble portion; isolating the insoluble portion in an inert atmosphere; flushing the insoluble portion with at least one dry inert gas so as to remove traces of the at least one second anhydrous organic solvent; and subjecting the flushed insoluble portion to a pressure of less than about 100 Torr so as to obtain the reduced-reactive-solvent LiFSI product.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
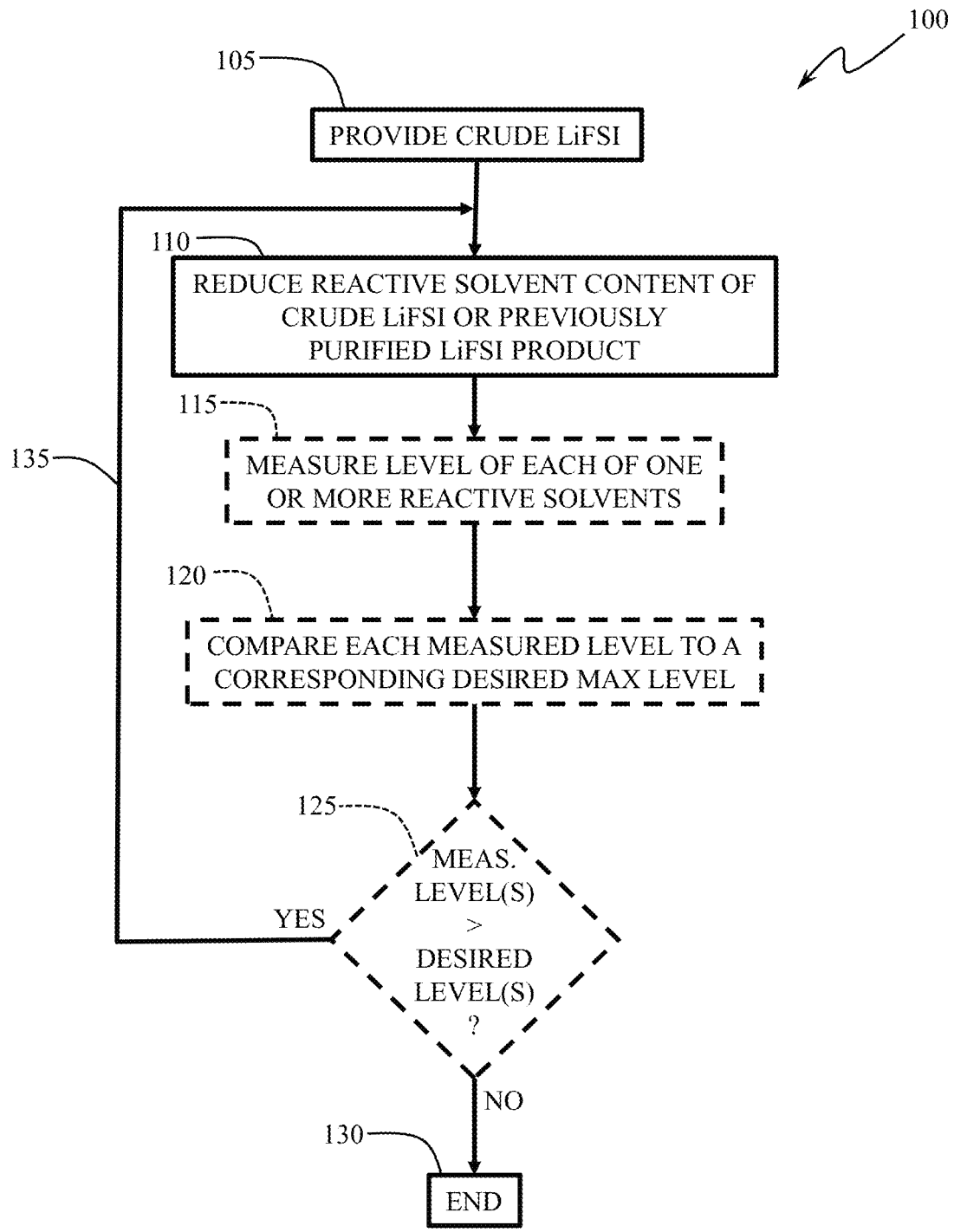
FIG. 1 is a flow diagram illustrating a multi-pass method of reducing the reactive solvent in lithium bis(fluorosulfonyl)imide (LiFSI) in accordance with aspects of the present disclosure.

In some aspects, the present disclosure is directed to methods of removing one or more reactive solvents from crude lithium bis(fluorosulfonyl)imide (LiFSI). As used herein and in the appended claims and unless note otherwise, the use of the term "reactive" to modify "solvent" or "solvents", or the like, shall mean that the solvent(s) is/are reactive to lithium metal within a lithium-based battery, such as lithium metal in the anode of a lithium-metal battery. As those skilled in the art will appreciate, "reactive" in this context refers to the magnitude of the reduction potential of lithium metal relative to the solvent(s). A reactive solvent has a reactive proton that has a relatively high reduction potential relative to lithium metal, which has a relatively low reduction potential. Examples of reactive solvents include protic solvents, such as water, and reactive organic solvents, such as alcohols. Conversely, as used herein and in the appended claims and unless noted otherwise, the use of the term "non-reactive" to modify "solvent" or "solvents", or the like, shall mean that the solvent(s) is/are non-reactive to lithium metal. Reactive solvent(s) is/are also not effective in passivating lithium metal, while non-reactive solvent(s) is/are either non-reactive towards lithium metal or effectively passivating toward lithium metal, i.e., make the electrolyte/lithium-anode system kinetically stable. Examples of non-reactive solvents include dimethyl carbonate, ethylmethyl carbonate, diethyl carbonate, fluorine-containing carbonates, and glycol ethers.

As used herein and in the appended claims, the term "crude" and like terms when referring to LiFSI indicate a synthesis product that contains at least LiFSI and one or more reactive solvents, such as reactive solvent(s) resulting from the synthesis and/or purification of the LiFSI or that is otherwise present in the LiFSI. The presence of reactive solvent(s) in LiFSI salt used in electrolytes for lithium-ion batteries and lithium-metal batteries can negatively impact the cycle performance, such as discharge capacity and capacity retention, of such batteries. Therefore, it is desirable to remove as much of the reactive solvent(s) present in the LiFSI salt as is practicable or possible. Such reactive solvents may also be referred to herein and in the appended claims as "solvent residue" or "solvent residues". Crude LiFSI may contain further impurities, such as impurities discussed below in section II.

As used herein and in the appended claims, the term "anhydrous" refers to having about 1% by weight of water or less, typically about 0.5% by weight of water or less, often about 0.1% by weight of water or less, more often about 0.01% by weight of water or less, and most often about 0.001% by weight of water or less. Within this definition, the term "substantially anhydrous" refers to having about 0.1% by weight of water or less, typically about 0.01% by weight of water or less, and often about 0.001% by weight of water or less.

Throughout the present disclosure, the term "about" when used with a corresponding numeric value refers to ±20% of the numeric value, typically ±10% of the numeric value, often ±5% of the numeric value, and most often ±2% of the numeric value. In some embodiments, the term "about" can mean the numeric value itself.

When describing a chemical reaction, such as any of the synthesis and purification reactions described herein and/or addressed in the appended claims, the terms "treating", "contacting", and "reacting", are used interchangeably and refer to adding or mixing two or more reagents under the conditions sufficient to produce the indicated and/or desired product(s). It should be appreciated that the reaction that produces the indicated and/or desired product may not necessarily result directly from the combination of the reagent(s) that was/were initially added. That is, there may be one or more intermediates that are produced in the mixture and ultimately lead to the formation of the indicated and/or desired product.

At commercial scale, crude LiFSI usually contains one or more reactive solvent residues, such as methanol, ethanol, or water, which come from a solvent source in which LiFSI is either synthesized or purified. These reactive solvent residues are known to solvate very strongly with alkali metal salts and are hard to remove by evacuating under vacuum without heating to a high temperature. However, LiFSI is unstable to heat at high temperature in the presence of reactive solvents, and the high heat causes defluorination of the LiFSI and produces hydrogen fluoride (HF), which is a strong acid known to be corrosive. The following schemes illustrate the defluorination of LiFSI, containing protic solvent, upon heating.

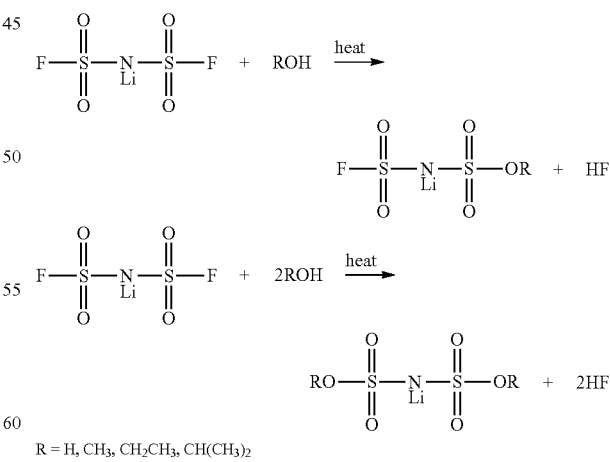

All protic solvents are also prone to proton reduction to yield hydrogen gas, and they are generally used for reductive electrochemistry only with electrodes such as mercury or carbon, for which proton reduction is kinetically slow. Protic solvents also react with lithium metal present in a lithium-based battery, especially reacting with a lithium-metal anode of a lithium-meal batter according to the following scheme to generate hydrogen gas.

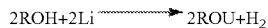

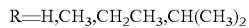

It is noted that while the foregoing details pertain to LiFSI, the same or similar issues with reactive solvents also exist with crude lithium bis(trifluoromethanesulfonyl)imide (LiTFSI), especially crude LiTFSI made using a commercial-scale process. Consequently, the general methodologies of reducing the amount of each of one or more reactive solvents described herein for crude LiFSI are also pertinent to crude LiTFSI.

In another aspect, the present disclosure is directed to a reduced-reactive-solvent LiFSI product containing LiFSI and a relatively low level of one or more reactive solvents, such as one or more reactive solvents used in the synthesis and/or purification of crude LiFSI. Examples of reactive solvents that may be present in the crude LiFSI, or LiTFSI, include water, methanol, ethanol, and propanol, among others, either singly or in various combinations with one another. As described in more detail below, such reduced-reactive-solvent LiFSI product may be made using a reactive-solvent-reduction method of the present disclosure that can generate the reduced-reactive-solvent LiFSI product in a single pass through of one of the disclosed basic processes or in multiple passes through one or more of the disclosed basic processes.

In still a further aspect, the present disclosure is directed to uses of LiFSI salt products of the present disclosure. For example, LiFSI salt products of the present disclosure can be used to make electrolytes that can be used in any suitable electrochemical device, such as a battery or supercapacitor, especially secondary lithium-ion batteries and secondary lithium-metal batteries.

While in some embodiments the removal and/or replacement of reactive solvent(s) with non-reactive solvent(s) using a methodology disclosed herein may be sufficient for a particular usage of the LiFSI (or LiTFSI), in other cases it can be beneficial to apply a reactive-solvent-removal/replacement methodology of the present disclosure to a higher-purity LiFSI product than is otherwise available. Two paths of providing such higher-purity LiFSI specifically addressed hereinbelow are methods that remove non-solvent impurities from crude LiFSI and methods of synthesizing crude LiFSI using an aqueous-based neutralization process. Consequently and as noted below, additional aspects of the present disclosure include these methods and processes, as well as various combinations of two or more methods disclosed herein, their attendant intermediate and final products and uses thereof, as noted immediately below.

In some additional aspects, the present disclosure is directed to methods of purifying crude LiFSI to remove any one or more of various non-solvent impurities from the crude LiFSI. As used in the context of non-solvent impurity removal and in the appended claims, the term "crude LiFSI" and like terms indicate a synthesis product that contains at least LiFSI and one or more non-solvent impurities, such as non-solvent impurities resulting from the synthesis of the LiFSI. Hereinafter and in the appended claims, this type of impurity is referred to as a "synthesis impurity." Each of the impurities targeted to be removed to one extent or another using the disclosed methods is referred to herein and in the appended claims as a "target impurity". In an example, a target impurity can be a synthesis impurity that is a byproduct of the synthesis of the LiFSI as noted above.

At commercial scales, crude LiFSI is commonly obtained by neutralizing hydrogen bis(fluorosulfonyl)imide (HFSI), which contains various concentrations of synthesis impurities, such as hydrogen fluoride (HF), fluorosulfuric acid ($FSO_3H$), hydrogen chloride (HCl), and sulfuric acid ($H_2SO_4$), with lithium carbonate ($Li_2CO_3$) or lithium hydroxide (LiOH). Using the LiOH-based synthesis as an example, during this process of making crude LiFSI, the HFSI and the impurities such as HF, $FSO_3H$, HCl, and $H_2SO_4$, are converted to the corresponding Li salt to produce LiFSI, $Li_2SO_4$, $FSO_3Li$, LiF, and LiCl, respectively, by the following schemes:

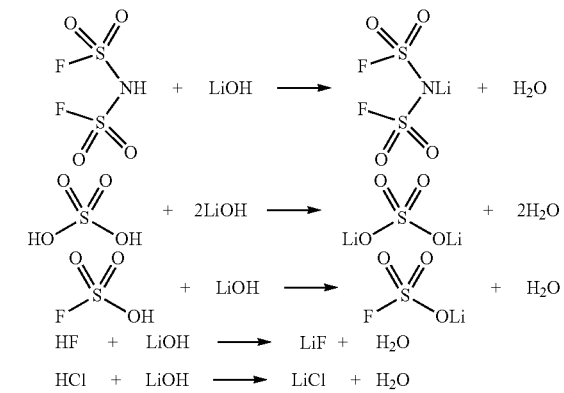

In this example, the $Li_2SO_4$, $FSO_3Li$, LiF, and LiCl are target impurities (here, synthesis impurities) that are desired to be removed from the crude LiFSI. In some embodiments, purification methods of the present disclosure remove one or more synthesis impurities, such as one or more of the $Li_2SO_4$, $FSO_3Li$, LiF, and LiCl, and/or any other impurity having a molecular structure and properties amenable for removal by the disclosed methods, each of which is a "target impurity" in the parlance of this disclosure.

In another aspect, the present disclosure is directed to a purified LiFSI product containing LiFSI and a relatively low level of one or more target impurities, such as one or more synthesis impurities, for example, $Li_2SO_4$, $FSO_3Li$, LiF, and LiCl as noted above. As described in more detail below, such purified LiFSI product may be made using a purification method of the present disclosure that can generate the purified LiFSI product in a single pass through one of the disclosed basic processes or in multiple passes through one or more of the disclosed basic processes.

In still a further aspect, the present disclosure is directed to uses of LiFSI salt products of the present disclosure. For example, LiFSI salt products of the present disclosure can be used to make electrolytes that can be used in any suitable electrochemical device, such as a battery or supercapacitor.

In yet another aspect, the present disclosure is directed to a method of synthesizing LiFSI using an aqueous neutralization method followed removal of impurities. As described below in more detail, an example LiFSI synthesis method includes neutralizing hydrogen bis(fluorosulfonyl) imide (HFSI) (e.g., a purified HFSI) with one or more lithium bases in deionized water so as to yield an aqueous solution of LiFSI and one or more synthesis impurities. Additional steps may include removing at least a portion of the deionized water to obtain crude LiFSI and then purifying the crude LiFSI to remove at least some of the one or more synthesis impurities.

In a yet further aspect, the present disclosure is directed to performing any one of various combinations if the differing methodologies disclosed herein. For example, an overall process may include using an aqueous neutralization synthesis method of this disclosure to synthesize LiFSI, with this synthesis followed by implementing, using the synthesized LiFSI, either a non-reactive-solvent purification process of this disclosure or a reactive-solvent reduction/replacement method of this disclosure, or a combination of the two. If both additional methods are used, it is generally preferred to perform the reactive-solvent-reduction/replacement method last, especially if any reactive solvents are used in the non-reactive-solvent purification process. As another example, an overall process may include starting with an already synthesized crude LiFSI, such as a commercially sourced, conventionally synthesized crude LiFSI, and then performing one, the other, or both, of a non-reactive-solvent purification process of this disclosure or a reactive-solvent reduction/replacement method of this disclosure.

In still yet further aspects, the present disclosure is directed to purified LiFSI products containing LiFSI made using any one of the combinations of methods described in the immediately preceding paragraph, electrolytes made using purified LiFSI salt made using any one of the combinations described in the immediately preceding paragraph, and uses of such electrolytes.

Details of the foregoing and other aspects of the present disclosure are described below.

I. REMOVING/REPLACING REACTIVE SOLVENT(S)

This section addresses methods of removing and/or replacing reactive solvents in lithium sulfonimide salts, reduced-reactive-solvent lithium sulfonimide salts made thereby, and uses of such reduced-reactive-solvent lithium sulfonimide salts.

I.A. EXAMPLE METHODS OF REMOVING/REPLACING REACTIVE SOLVENT(S) PRESENT CRUDE LiFSI

As noted above, crude LiFSI can contain one or more reactive solvents, for example, as a residue from synthesis and/or purification of the LiFSI. A reactive-solvent-removal method of the present disclosure can be used to reduce, including completely remove, one or more reactive solvents in the crude LiFSI. Because the removal of the reactive solvent(s) utilizes one or more non-reactive solvents and at least some of the non-reactive solvent(s) remain after completing the reactive-solvent removal method, in some embodiments the method may also/alternatively be considered a solvent-replacement method, with undesirable reactive solvent(s) being replaced by non-reactive solvent(s) that do not have the negative battery performance impact of the reactive solvent(s). As described below, in some embodiments, the non-reactive solvent(s) that remain are often about 3000 ppm or less, such as in a range from about 100 ppm to about 3000 ppm.

In some embodiments, the reactive-solvent-removal method includes contacting the crude LiFSI with at least one first anhydrous organic solvent under an inert condition to create a solution containing the crude LiFSI and the one or more reactive solvents. Generally, this step involves replacing coordinated reactive solvent molecules bonded to the ions with desirable non-reactive molecules. In some embodiments, the solubility of the LiFSI in the at least one first anhydrous organic solvent is at least about 35% to about 65% at room temperature. In some embodiments, the contacting of the crude LiFSI with the at least one first anhydrous organic solvent includes contacting the crude LiFSI with an amount of the at least one first anhydrous organic solvent that is in a range of about 35 wt. % to about 65 wt. % relative to the weight of the entire solution.

The inert condition during the contacting of the LiFSI with the at least one first anhydrous organic solvent may be created using any suitable technique, such as by using argon gas and/or nitrogen gas, and/or other inert dry (i.e., water-free) gas, among others. The purification method may be performed at any suitable pressure, such as 1 atmosphere of pressure.

Examples of anhydrous organic solvents from which each of the at least one first anhydrous organic solvent may be selected include, but are not necessarily limited to: organic carbonates, such as dimethyl carbonate (DMC), diethyl carbonate (DEC), ethyl methyl carbonate (EMC), propyl methyl carbonate (PMC), ethylene carbonate (EC), fluoroethylene carbonate (FEC), and trans butylene carbonate; nitriles, such as acetonitrile, malononitrile, and adiponitrile; alkyl acetates, such as methyl acetate, ethyl acetate, propyl acetate, and butyl acetate; alkyl propionates, such as methyl propionate (MP) and ethyl propionate (EP). When removing one or more reactive solvents using one or more non-reactive organic solvents, such as for creating an LiFSI salt for a lithium-ion battery or a lithium-metal battery, each of the anhydrous organic solvents selected for the at least one first anhydrous organic solvent are desired to be non-reactive with lithium metal. Such non-reactive anhydrous organic solvents include DMC, DEC, EMC, fluoroethylene carbonate, difluoroethylene carbonate, and trifluoromethyl ethyl carbonate.

After contacting the crude LiFSI, or LiTFSI, with the at least one first anhydrous organic solvent, the solution is subjected to a vacuum so as to remove the at least one first anhydrous organic solvent and the one or more reactive solvents, such as one or more of water, methanol, or ethanol, among others that may be present, so as to obtain a solid mass. In some embodiments, the pressure of the vacuum may be less than about 100 Torr, less than about 10 Torr, or less than about 1 Torr, less than about 0.1 Torr, or less than about 0.01 Torr. In some embodiments, the vacuum is performed at a controlled temperature, such as at a temperature in the range of about 25° C. to about 40° C.

The solid mass may then be treated with at least 100 wt. % of one or more second anhydrous organic solvents in which the LiFSI in the solid mass is insoluble to create a combination having an insoluble portion. This treatment may remove any coordinated or solvated solvents. Examples of anhydrous organic solvents from which each of the one or more second anhydrous organic solvents may be selected include, but are not necessarily limited to, dichloromethane, dichloroethane, chloroform, pentane, hexane, heptane, octane, nonane, decane, undecane, and dodecane.

The insoluble portion is isolated from the combination in an inert atmosphere, such as provided by a dry inert gas, such as argon, nitrogen, another dry inert gas, or any combination thereof. The insoluble portion may be isolated in any suitable manner, such as filtration performed using any suitable methods, such as using one or more filter media, centrifuging, gravity separation, hydrocycloning, etc. Those skilled in the art will understand the appropriate filtration technique(s) to use in any particular instantiation of a protic-solvent-reduction method of the present disclosure.

The insoluble portion may be flushed with at least one inert gas (e.g., dry inert gas, i.e., less than 1 ppm water) so as to remove traces of the at least one second anhydrous organic solvent. Examples of inert gases from which each of the at least one dry inert gas may be selected include argon and nitrogen.

The flushed insoluble portion may be subjected to a pressure of less than about 100 Torr so as to obtain the reduced-protic-solvent LiFSI product or the reduced-protic-solvent LiTFSI product. In some embodiments, the pressure may be less than about 10 Torr, or less than about 1 Torr, less than about 0.1 Torr, or less than about 0.01 Torr. In one example, the in-vacuo pressure is less than about 0.01 Torr. In some embodiments, the vacuum is performed at a controlled temperature, such as at a temperature of less than about 40° C. (e.g., in a range of about 20° C. to about 40° C.). The resulting reduced-reactive-solvent LiFSI product is typically a white free-flowing powder.

The dried reduced-reactive-solvent LiFSI product may be stored in a dry inert container, such as a dry polytetrafluoroethylene (PTFE) container or a nickel alloy that is inert to free fluoride, at a reduced temperature, such as about 25° C. or below, and within an inert gas, such as argon, to inhibit degradation of the LiFSI during storage.

In a general example and using DMC as the at least one first anhydrous organic solvent and dichloromethane as the at least one second anhydrous organic solvent, in a typical process, crude LiFSI having various levels of one or more reactive solvents, such as water, methanol, and/or ethanol, among others, is contacted with about 30 wt. % to about 50 wt. % of anhydrous dimethyl carbonate in which LiFSI is soluble. In this example, the contacting of the crude LiFSI with the DMC is followed by removal of the DMC along with reactive solvent(s) such as the water, methanol, and/or ethanol under vacuum (e.g., <about 0.01 Torr). The removal of the DMC results in a solid mass. The method may further comprise treating the obtained solid mass with anhydrous dichloromethane, in which the LiFSI is insoluble, to obtain a combination of an insoluble portion and the anhydrous dichloromethane and any other non-insoluble component(s). The insoluble portion (e.g., powdered LiFSI) may be obtained by filtration, and traces of dichloromethane may be removed by flushing with dry Ar and/or dry $N_2$. Then, the flushed LiFSI may be subjected to a vacuum (e.g., <0.01 Torr) at a temperature of less than about 40° C. to get a dry reduced-reactive-solvent LiFSI product, here, a free-solvent-free LiFSI product. While the reduced-reactive-solvent LiFSI product may be free-solvent-free, practically speaking the LiFSI product will typically include at least some reactive and/or non-reactive solvent coordinated with the LiFSI. The dry protic-solvent-free LiFSI product may be stored in a PTFE container in inert conditions and, for example, at a temperature of less than about 25° C.

Depending on the amount(s) of reactive solvent(s) in the crude LiFSI from which the reactive solvent(s) is/are being removed using any one of the above methodologies and on the desired maximum amount(s) of the reactive solvent(s) in the desired LiFSI product, it may be necessary to perform a multi-pass method to sequentially reduce the amount(s) of the one or more reactive solvents with each pass. Such a multi-pass method may utilize any one or more of the foregoing methodologies in series to continually reduce the level of each of one or more reactive solvents initially in the crude LiFSI and then that may still be remaining in the resulting reduced-reactive-solvent LiFSI product. An example multi-pass reactive-solvent-reduction method 100 of the present disclosure is illustrated in FIG. 1.

Referring to FIG. 1, at block 105, a crude LiFSI containing one or more reactive solvents present at certain level(s) is provided. At block 110, the reactive-solvent content of the crude LiFSI is reduced using any one of the methodologies described above. An end result of the reactive-solvent reduction at block 110 is a reduced-reactive-solvent LiFSI product in which the level of each reactive solvent has been reduced. At optional block 115, the level of each of one or more of the reactive solvents in the reduced-reactive-solvent LiFSI product is measured using a suitable measurement procedure. At optional block 120, each of the measured levels is compared to a maximum desired level for the reactive solvent(s) that is acceptable to be in the reduced-reactive-solvent LiFSI product. At optional block 125, it is determined whether any one or more of the measured levels exceeds the corresponding desired maximum level. If not, i.e., if each measured level is below the corresponding desired maximum level, then the reduced-reactive-solvent LiFSI product meets the desired reduced reactive solvent level specification and does not need further reactive-solvent reduction. Therefore, the multi-pass reactive-solvent-reduction method 100 can end at block 130.

However, if at block 125 any one or more of the measured levels exceeds the corresponding desired maximum level(s), then the reduced-reactive-solvent LiFSI product processed in the previous pass through reactive-solvent reduction at block 110 may be processed at block 110 via a loop 135. In this pass through reactive-solvent reduction at block 110, the anhydrous organic solvent(s) used for making the solution and/or washing the crystalized LiFSI may be the same or different as used in the previous pass through reactive-solvent reduction at block 110. At the end of reactive-solvent reduction at block 110, at optional blocks 115 and 120 one or more measurements of the reactive-solvent level(s) and one or more comparisons of the measured level(s) to one or more corresponding desired maximum levels can be made to determine whether the method 100 can end at block 130 or the LiFSI in the reduced-reactive-solvent LiFSI product of the most recent pass should be subjected to reactive-solvent reduction again via the loop 135.

A nonlimiting but illustrative example of where a multi-pass reactive-solvent-reduction method could be useful is a lithium-based electrolyte, such as LiFSI, for a lithium-based battery. Crude LiFSI would typically have reactive solvents, such as methanol, ethanol, and/or propanol from crystallization process of LiFSI. These reactive solvents are present sometimes >3000 ppm. However, such reactive solvents levels are harmful to lithium-metal batteries, since they react with lithium metals to produce hydrogen gas and lithium alkoxide. Consequently, it is desired to keep reactive solvent level in LiFSI-based electrolytes for lithium-metal batteries low, such as less than about 200 ppm, less than about 100 ppm, less than about 50 ppm, or less than about 10 ppm. Using a multi-pass purification methodology of the present disclosure, such as the multi-pass reactive-solvent-reduction method 100 illustrated in FIG. 1, for crude LiFSI used to synthesize the LiFSI salt used in the electrolyte may be a useful way of achieving such low reactive solvent levels.

As a non-limiting but illustrative example, multi-pass reactive-solvent reduction method 100 may be used to lower the reactive solvents (in the form of target reactive alcohols) content in an LiFSI product to below 1 ppm, starting with crude LiFSI containing 3000 ppm of alcohols as a synthesis impurity. At block 105, a desired amount of the crude LiFSI is provided. At block 110, the crude LiFSI is purified, i.e., the amount of undesirable alcohols is reduced, using any of the methodologies described above or exemplified below.

At optional block 115, the level of alcohols in the reduced-reactive-solvent LiFSI product are measured to be 1000 ppm. At optional block 120, the measured level of 1000 ppm is compared against the less-than-100 ppm requirement. At optional block 125, since 1000 ppm is greater than the less-than-100 ppm requirement, the reduced-reactive-solvent LiFSI product is processed at block 110, via loop 135, using the same or differing reactive-solvent-reduction process as used to reduce the reactive solvent level in the initial crude LiFSI. In this second pass, the starting alcohol level is 1000 ppm, and the ending impurity level in the twice reactive-solvent-reduced LiFSI product is now 500 ppm, as measured at optional block 115. After comparing this 500 ppm level to the less-than-100 ppm requirement at optional block 120, at optional block 125 it is determined that the twice reactive-solvent-reduced LiFSI product needs to be processed again at block 110, via loop 135, with the same or different reactive-solvent-reduction method used in either of the two prior passes.

In this third pass, the starting alcohol level is 500 ppm, and the ending impurity level in the thrice-reactive-solvent-reduced LiFSI product is now less than 100 ppm, as measured at optional block 115. After comparing this less-than-100 ppm level to the less-than-100 ppm requirement at optional block 120, at optional block 125 it is determined that the thrice reactive-solvent-reduced LiFSI product satisfies the requirement such that multi-pass reactive-solvent-reduction method 100 can end at block 130.

I.B. EXAMPLES

The above methodologies are further illustrated by the following examples, although it will be understood that these examples are included merely for purposes of illustration and are not intended to limit the scope of the present disclosure. Unless otherwise stated, all the chemicals used in these examples were of high purity and obtained from reputable commercial sources. Stringent precautions were taken to exclude moisture from the processes, and reactions were performed using well-ventilated hoods.

I.B.1. Example 1

Removal of methanol from LiFSI using DMC and dichloromethane: In a 250 mL dry flask, LiFSI (200 g), containing 4000 ppm of methanol and 50 ppm of water, was taken under a nitrogen atmosphere and cooled to 10° C. with a water bath. Anhydrous DMC (140 g (~41 wt. %)) was added-in portion-wise with stirring to get a clear solution. The mixture was stirred at room temperature for 0.5 hour. The clear solution was concentrated at a reduced pressure of <0.01 Torr to get a solid, which was treated with anhydrous dichloromethane (150 g) under argon. The combination was stirred at room temperature for 1 hour, and the desired insoluble LiFSI product was isolated by filtration. Traces of dichloromethane were removed by flushing with dry Ar/N$_2$ gas. The isolated LiFSI was dried at 35° C. in vacuo (<0.1 Torr) to obtain the reduced-reactive-solvent LiFSI product in 90% yield, with methanol at 0 ppm and water at 15.0 ppm.

I.B.2. Example 2

Removal of ethanol from LiFSI using DMC and dichloromethane: In a 250 mL dry flask, LiFSI (178 g), containing 2900 ppm of ethanol and 15 ppm of water, was taken under nitrogen atmosphere and cooled to 10° C. with a water bath. Anhydrous DMC (140 g (~44 wt. %)) was added-in portion-wise with stirring to get a clear solution. The mixture was stirred at room temperature for 0.5 hour. The clear solution was concentrated at reduced pressure of <0.01 Torr to get a solid, which was treated with anhydrous dichloromethane (150 g) under argon. The combination was stirred at room temperature for 1 hour, and the desired insoluble LiFSI product was isolated by filtration. Traces of dichloromethane were removed by flushing with dry Ar/N$_2$ gas. The isolated LiFSI was dried at 35° C. in vacuo (<0.1 Torr) to obtain the reduced-reactive-solvent LiFSI product in 90% yield, with ethanol at 0 ppm and water at 4 ppm.

I.B.3. Example 3

Removal of isopropanol from LiFSI using DMC and dichloromethane: In a 250 mL dry flask, LiFSI (350 g), containing 2000 ppm of isopropanol and 30 ppm of water, was taken under nitrogen atmosphere and cooled to 10° C. with a water bath. Anhydrous DMC (200 g (~36 wt. %)) was added-in portion-wise with stirring to get a clear solution. The mixture was stirred at room temperature for 0.5 hours. The clear solution was concentrated at reduced pressure of <0.01 Torr to get a solid, which was treated with anhydrous dichloromethane (350 g) under argon. The combination was stirred at room temperature for 1 hour, and desired insoluble LiFSI product was isolated by filtration. Traces of dichloromethane were removed by flushing with dry Ar/N$_2$ gas. The isolated LiFSI was dried at 35° C. in vacuo (<0.1 Torr) to obtain the reduced-reactive-solvent LiFSI product in 92% yield, with isopropanol at 0 ppm and water at 4 ppm.

I.C. EXAMPLE REDUCED-REACTIVE-SOLVENT LiFSI PRODUCTS

Using any of the foregoing reactive-solvent-reduction methodologies, such as any of the single-pass reactive-solvent-reduction methodologies disclosed above or multi-pass methodology 100 of FIG. 1, the resulting purified LiFSI products can have exceptionally low levels of target reactive levels of reactive solvent(s). For example, in some embodiments particularly suited for use in lithium-metal batteries, the amount of reactive solvent(s) remaining in the final ultrapure LiFSI salt product (i.e., after completion of the reactive-solvent-reduction as disclosed herein) is preferably less than about 100 ppm, more preferably less than about 50 ppm, and most preferably less than about 25 ppm. Though in some embodiments non-reactive solvent remaining in the final ultrapure LiFSI salt product is less detrimental to battery performance than reactive solvent, in such embodiments the amount of non-reactive solvent(s) remaining in the final ultrapure LiFSI salt product is typically less than about 3000 ppm and more typically less than about 1000 ppm. When purification is performed using only non-reactive solvents for all of the purification steps, the final ultrapure LiFSI salt product will typically have at least about 100 ppm of non-reactive solvent(s) but will typically have no more than about 100 ppm of reactive solvent(s). The level of reactive solvent(s) in the crude LiFSI prior to reactive-solvent reduction in accordance with the present disclosure may be about 500 ppm or higher, about 1000 ppm or higher, or about 2000 ppm or higher. In one example wherein DMC is used in the reactive solvent removal/replacement method, purified LiFSI of the present disclosure has about 0.2% to about 0.3% DMC and water as the reactive solvent at less than 100 ppm.

I.D. EXAMPLE USES OF REDUCED-REACTIVE-SOLVENT LiFSI SALT PRODUCTS

As mentioned above, a reduced-reactive-solvent LiFSI salt product may be used to make a reduced-reactive-solvent LiFSI-based electrolyte for an electrochemical device, among other things. Here, the reactive-solvent reduction of the reduced-reactive-solvent electrolyte flows from the fact that the reduced-reactive-solvent LiFSI salt product has been processed in accordance with any one or more of the methods disclosed herein. Such reduced-reactive-solvent electrolytes can be made using any of a variety of methods, such as by mixing a reduced-reactive-solvent LiFSI salt product (salt) of the present disclosure with one or more solvents, one or more diluents, and/or one or more additives, which solvents, diluents, and additives may be known in the art.

When the electrochemical device is a lithium-based device, such as a secondary lithium-ion battery or a secondary lithium-metal battery, it is desired to have the least amount of reactive solvent(s) in the LiFSI salt used to make the electrolyte so that the reactive solvent(s) does/do not impact the performance of the battery. For example, the more reactive solvent in the LiFSI salt, the greater the negative impact of that reactive solvent on cycle performance, such as discharge capacity and capacity retention. Consequently, for lithium-based secondary batteries, it is desirable to remove as much of the reactive solvent(s) as practicable from the LiFSI salt used in the electrolyte for such batteries. Typically and as noted above, this involves using one or more non-reactive solvent(s) in the reactive-solvent-reduction processes disclosed herein. As such, most of the reactive solvent in the initial crude LiFSI is removed and/or replaced with the non-reactive solvent(s) used in the corresponding reactive-solvent-reduction process. In some embodiments, the reduced-reactive-solvent LiFSI product made using techniques disclosed herein can have reactive and/or non-reactive solvent levels as indicated in the section above titled "I.C. EXAMPLE REDUCED-PROTIC-SOLVENT LiFSI PRODUCTS".

I.D.1. Preparing an LiFSI Salt for Use in an Electrolyte for a Lithium-Based Electrochemical Device As alluded to above, an important step in preparing an electrolyte for use in a lithium-based electrochemical device, such as a secondary lithium battery having a lithium-metal anode, is to remove as much reactive solvent residue from an LiFSI salt that contains such residue, for example, from the process(es) of synthesizing and/or purifying the LiFSI salt. In some embodiments, this removal process may include a replacement aspect in which one or more reactive solvents, such as one or more alcohols and water, are at least partially replaced by one or more non-reactive solvents. As described above, by removing and/or replacing reactive solvent residue(s) in an LiFSI salt prior to making an electrolyte for a lithium-based electrochemical device will result in better performance and/or increased cycle life of the electrochemical device due to the fact that far less—and in some cases no—reactive solvent is present in the LiFSI salt to react with the lithium metal within the device. It is noted that the non-reactive solvent(s) used in the replacement/removal process can be selected based on it/them being beneficial to the lithium-based electrochemical device. For example, a selected non-reactive solvent may be of a type that can be used as a solvent in which the LiFSI salt is dissolved so as to provide the electrolyte with the desired concentration. In this case, removing reactive solvent(s), potentially also replacing it/them with a small portion of a final solvent using a reactive solvent removal/replacement methodology of the present disclosure, becomes beneficial to the final electrolyte. Alternatively, the non-reactive solvent(s) selected for the reactive-solvent removal/replacement process may be a desirable additive, separate and apart from any primary salt-dissolving function, added to particularly benefit the electrochemical device, such as an additive for promoting formation of a solid-electrolyte interphase (SEI) layer on a lithium-metal anode, among others.

A method of preparing an LiFSI salt for use in a lithium-based electrochemical device includes providing a LiFSI salt containing one or more reactive solvent residues that would be detrimental to the functioning of the lithium-based device if such solvent residue(s) were not removed and/or replaced prior to using the LiFSI salt to prepare an electrolyte for the lithium-based device. The providing of the LiFSI salt may include purchasing the LiFSI salt from a commercial provider of such salt or synthesizing and/or purifying the crude LiFSI salt in house. This reactive-solvent-residue-containing LiFSI salt may then be processed according to any of the methodologies disclosed herein, such as the methodologies described above in the section titled "I.A. EXAMPLE METHODS OF REMOVING REACTIVE SOLVENT(S) FROM CRUDE LiFSI". The method of preparing the LiFSI salt for using in a lithium-based electrochemical device may include selecting one or more non-reactive solvents for use in the reactive-solvent removal/replacement method. It is noted that the forward slash, or virgule, in "removal/replacement" and similar locations means "and/or", that is, one, the other, or both, as is commonly understood. In some embodiments, at least one of the non-reactive solvents selected is selected on the basis of not only being non-reactive to lithium metal but also as providing a positive benefit, such as SEI layer growth promotion, in the manner of an electrolyte additive. Once the LiFSI salt has been subjected to the reactive-solvent removal/replacement processing, it may then be used to make an electrolyte for the lithium-based electrochemical device.

Figure 2:
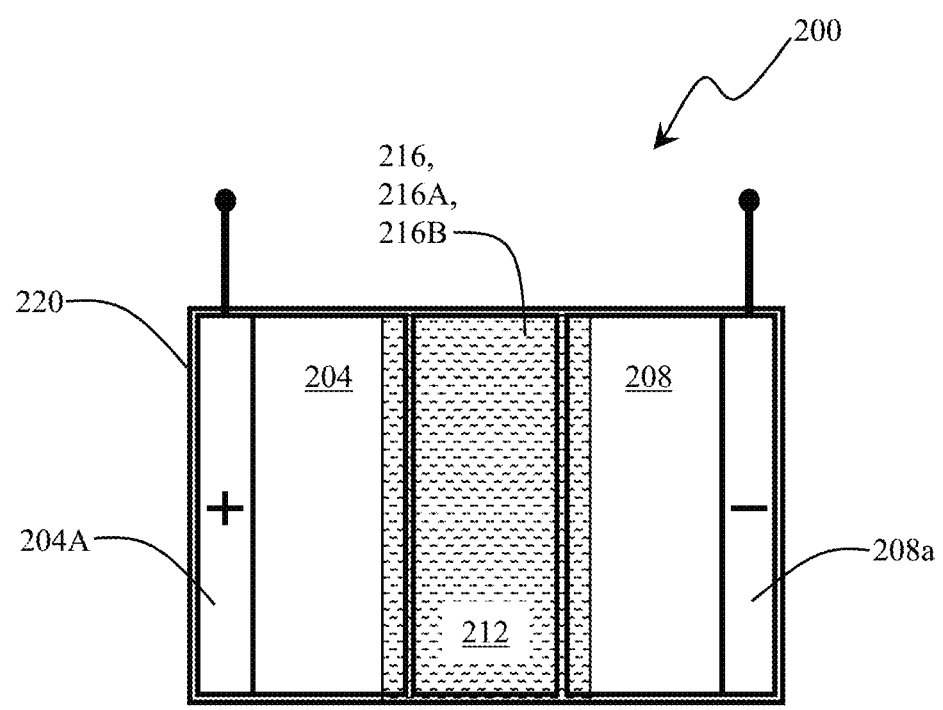
FIG. 2 is a high-level diagram illustrating an electrochemical device made in accordance with aspects of the present disclosure.

I.D.2. Example Electrochemical Device Utilizing an LiFSI Salt Made Using a Method of the Present Disclosure FIG. 2 illustrates an electrochemical device 200 made in accordance with aspects of the present disclosure. Those skilled in the art will readily appreciate that the electrochemical device 200 can be, for example, a battery or a supercapacitor. In addition, those skilled in the art will readily understand that FIG. 2 illustrates only some basic functional components of the electrochemical device 200 and that a real-world instantiation of the electrochemical device, such as a secondary battery or a supercapacitor, will typically be embodied using either a wound construction or a stacked construction. Further, those skilled in the art will understand that the electrochemical device 200 will include other components, such as electrical terminals, seal(s), thermal shutdown layer(s), and/or vent(s), among other things, that, for ease of illustration, are not shown in FIG. 2.

In this example, the electrochemical device 200 includes spaced-apart positive and negative electrodes 204, 208, respectively, and a pair of corresponding respective current collectors 204A, 208A. A porous dielectric separator 212 is located between the positive and negative electrodes 204, 208 to electrically separate the positive and negative electrodes but to allow ions of a reduced-reactive-solvent LiFSI-based electrolyte 216 made in accordance with the present disclosure to flow therethrough. The porous dielectric separator 212 and/or one, the other, or both of the positive and negative electrodes 204, 208, depending on whether porous or not, is/are impregnated with the reduced-protic-solvent LiFSI-, or LiTFSI-, based electrolyte 216. In FIG. 2, both the positive and negative electrodes 204, 208 are illustrated as being porous by way of the reduced-reactive-solvent LiFSI-based electrolyte 216 being illustrated as extending into them. As described above, a benefit of using a reduced-reactive-solvent LiFSI-based electrolyte of the present disclosure for reduced-reactive-solvent LiFSI-based electrolyte 216 is that reactive solvent(s) that can be in LiFSI-based electrolytes, such as protic-solvents from synthesis or purification, can be reduced to levels that are acceptable (e.g., meet one or more protic-solvent level specifications) for use in the electrochemical device 200. Examples of reduced-reactive-solvent LiFSI products (salts) and example low levels of their reactive solvent(s) that can be used to make reduced-reactive-solvent LiFSI-based electrolyte 216 are described above. The electrochemical device 200 includes a container 220 that contains the current collectors 204A, 208A, the positive and negative electrodes 204, 208, the porous dielectric separator 212, and the reduced-protic-solvent LiFSI-, or LiTFSI-, based electrolyte 216.

As those skilled in the art will understand, depending upon the type and design of the electrochemical device, each of the positive and negative electrodes 204, 208 comprises a suitable material compatible with the alkali-metal ions and other constituents in the purified LiFSI-based electrolyte 216. Each of the current collectors 204A, 208A may be made of any suitable electrically conducting material, such as copper or aluminum, or any combination thereof. The porous dielectric separator 212 may be made of any suitable porous dielectric material, such as a porous polymer, among others. Various battery and supercapacitor constructions that can be used for constructing the electrochemical device 200 of FIG. 2, are known in the art. If any of such known constructions is used, a novelty of electrochemical device 200 lies in the high purity of the reduced-reactive-solvent LiFSI-based electrolyte 216 that has not been achieved with conventional methods of making LiFSI salts and corresponding electrolytes.

In one example, the electrochemical device 200 may be made as follows. The reduced-reactive-solvent LiFSI-based electrolyte 216 may be made starting with a crude LiFSI, which is then purified using any one or more of the reactive-solvent-reduction methods described herein to create a reduced-reactive-solvent LiFSI product having suitable low levels of one or more target reactive solvents. This reduced-reactive-solvent LiFSI product may then be used to make the reduced-reactive-solvent LiFSI-based electrolyte 216, for example, by adding one or more solvents, one or more diluents, and/or one or more additives that enhance the performance of the electrochemical device 200. The reduced-reactive-solvent LiFSI-based electrolyte 216 may then be added to the electrochemical device 200, after which the container 220 may be sealed.

II. REMOVING NON-SOLVENT IMPURITIES FROM CRUDE LITHIUM SULFONIMIDE SALTS

This section addresses methods of removing non-solvent impurities from crude lithium sulfonimide salts, purified lithium sulfonimide salts made thereby, and uses of such purified lithium sulfonimide salts.

II.A. EXAMPLE METHODS OF PURIFYING CRUDE LiFSI

While a number of processes for producing LiFSI are known, each of the known methods for synthesizing LiFSI at a commercial scale produces crude LiFSI containing various levels of impurities, such as synthesis impurities. For example, and as noted above, LiFSI is often commercially produced using crude HFSI that is reacted with $Li_2CO_3$ or LiOH, and the crude HFSI contains various synthesis impurities that result in impurities in the crude LiFSI so synthesized.

For example, one method of synthesizing HFSI uses urea ($NH_2CONH_2$) and fluorosulfonic acid ($FSO_3H$). Disadvantages of this process are low yield of HFSI and the isolated HFSI having a large excess of fluorosulfonic acid as an impurity. Since the boiling point (b.p.) of fluorosulfonic acid (b.p. 165.5° C.) and the b.p. of HFSI (b.p. 170° C.) are very close to one another, it is very difficult to separate them from one another by simple fractional distillation [1]. An attempt to remove fluorosulfonic acid has been made by treating a mixture of HFSI and fluorosulfonic acid with sodium chloride where sodium chloride selectively reacts with fluorosulfonic acid to make sodium salts and HCl byproducts. This process has suffered from low yield of purified HFSI, and the HFSI product was also contaminated with some chloride impurities (HCl and NaCl) as impurities.

Another method of synthesizing HFSI for use in LiFSI synthesis involves fluorinating bis(chlorosulfonyl)imide (HCSI) with arsenic trifluoride ($AsF_3$). In this reaction, HCSI is treated with $AsF_3$. Arsenic trifluoride is toxic, and because it has a high vapor pressure, it is particularly difficult to handle on an industrial scale. A typical reaction uses 1:8.6 ratio of HCSI to $AsF_3$. HFSI produced by this method was also found to be contaminated with $AsF_3$ and $AsCl_3$ synthesis impurities, which were found to be a good source of chloride and fluoride impurities [2].

HFSI for use in LiFSI synthesis can also be prepared by fluorinating HCSI with antimony trifluoride (SbF3). The antimony trichloride byproduct of this reaction has both high solubility in HFSI and is sublimatable in nature; it is very difficult to separate from the desired product. The product of this reaction is typically contaminated with antimony trichloride, which is a good source of chloride impurities [3].

Yet another method for producing HFSI for use in LiFSI synthesis involves reacting HCSI with excess anhydrous HF at high temperature [4]. The yield of this reaction is at most 60%, with the product contaminated with fluorosulfonic acid that is produced from the decomposition of HCSI. This by-product is difficult to remove, as the boiling point is close to the boiling point of HFSI. This reaction using anhydrous HF to fluorinate HSCI has achieved >95% yield [5], but still the product is contaminated with fluorosulfonic acid, hydrogen fluoride, hydrogen chloride, and sulfuric acid as synthesis impurities.

Reacting HCSI with bismuth trifluoride ($BiF_3$) has been reported to yield HFSI in a cleaner reaction product. In this reaction, $BiCl_3$ byproduct that is formed can be easily separated from HFSI by fractional distillation, since $BiCl_3$ is not sublimatable [6]. Still, however, the product has some chloride, fluoride, and fluorosulfonic acid as synthesis impurities.

In another method of synthesizing HFSI, potassium bis (fluorosulfonyl)imide (KFSI) is reacted with perchloric acid [7]. In this process, the byproduct potassium perchlorate is considered to be explosive. Also, the isolated HFSI is contaminated with high level of potassium cations and some chloride impurities that are present in KFSI.

Hydrogen bis(fluorosulfonic acid) also known as imidobis(sulfuric acid) difluoride having the formula, $FSO_2NH-O_2F$, is a colorless liquid having a melting point (m.p.) of 17° C., a b.p. of 170° C., and a density 1.892 g/cm$^3$. It is very well soluble in water and in a number of organic solvents. Hydrolysis in water is relatively slow and leads to the formation of HF, $H_2SO_4$, and amidosulfuric acid ($H_3NSO_3$). HFSI is a strong acid, with a pKa of 1.28 [8].

A purification method of the present disclosure can be used to remove target impurities, such as synthesis impurities and/or other impurities, present in crude LiFSI, for example, a crude LiFSI synthesized using crude HFSI made using any one or more of the foregoing synthesis methods. In some embodiments, the purification method includes contacting crude LiFSI with at least one first anhydrous organic solvent under inert conditions to create a solution containing the crude LiFSI and the one or more target impurities. In some embodiments, the solubility of the LiFSI in the at least one first anhydrous organic solvent is at least about 60% at room temperature, typically in a range of about 60% to about 90%, and the solubility of each of the one or more target impurities is typically no more than about 20 parts per million (ppm) at room temperature, and often, for example, less than about 13 ppm. In some embodiments, the contacting of the crude LiFSI with at least one first anhydrous organic solvent is performed using a minimum amount of the at least one first anhydrous organic solvent. By "minimum amount" in the context of the at least one first anhydrous organic solvent, it is meant that the at least one first anhydrous organic solvent is provided in an amount substantially at which the LiFSI no longer continues to dissolve. In some embodiments, the minimum amount of the at least one anhydrous inorganic solvent falls in a range of about 50 wt. % to about 75 wt. % of the solution.

In some embodiments, the contacting of the crude LiFSI with the at least one first anhydrous organic solvent is performed at a temperature lower than a temperature in a range of about 15° C. to about 25° C. The dissolution of the crude LiFSI in the at least one first anhydrous organic solvent is an exothermic reaction. Consequently, in some embodiments, the temperature of the solution may be controlled using any suitable temperature control apparatus, such as a chiller, thermostat, circulator, etc. In some embodiments, the temperature of the solution is controlled to keep the temperature of the solution below about 25° C. as the at least one anhydrous organic solvent is contacted with the crude LiFSI. To attain the minimum amount of the at least one first anhydrous organic solvent and/or to control the temperature of the solution during the contacting of the crude LiFSI by the at least one first anhydrous organic solvent, the at least one anhydrous organic solvent may be added continuously or continually at precisely controlled rates or in precisely controlled amounts using suitable feed or dosing devices.

The inert conditions during the contacting of the LiFSI with the at least one first anhydrous organic solvent may be created using any suitable technique, such as by using argon gas and/or nitrogen gas, and/or other inert dry (i.e., water-free) gas, among others. The purification method may be performed at any suitable pressure, such as 1 atmosphere of pressure.

Examples of anhydrous organic solvents from which each of the at least one first anhydrous organic solvent may be selected include, but are not necessarily limited to, dimethyl carbonate (DMC), diethyl carbonate (DEC), ethyl methyl carbonate (EMC), propyl methyl carbonate (PMC), ethylene carbonate (EC), fluoroethylene carbonate (FEC), trans butylene carbonate, acetonitrile, malononitrile, adiponitrile, methyl acetate, ethyl acetate, propyl acetate, butyl acetate, methyl propionate (MP), ethyl propionate (EP), methanol, ethanol, propanol, and isopropanol.

After contacting the crude LiFSI with the at least one first anhydrous organic solvent, at least one second anhydrous organic solvent is added to the solution so as to precipitate that at least one target impurity. The at least one second anhydrous organic solvent is selected such that the LiFSI and the one or more target impurities is substantially insoluble (as noted above, it is generally desirable that target impurities should not be soluble more than 20 ppm) in the at least one second anhydrous organic solvent. In some embodiments, at least one second anhydrous organic solvent is added in a minimum amount. By "minimum amount" in the context of the at least one second anhydrous organic solvent, it is meant that the at least one second anhydrous organic solvent is provided in an amount substantially at which the one or more target impurities no longer continue to precipitate out of the solution. In some embodiments, the minimum amount of the at least one anhydrous inorganic solvent falls in a range of greater than 0 wt. % to no more than about 10 wt. % of the solution. The at least one second anhydrous organic solvent may be added under the same temperature, pressure, and inert conditions as present during the contacting of the crude LiFSI with the at least one first anhydrous organic solvent.

Examples of anhydrous organic solvents from which each of the at least one second anhydrous organic solvent may be selected include, but are not necessarily limited to, dichloromethane, dichloroethane, chloroform, pentane, hexane, heptane, octane, nonane, decane, undecane, dodecane.

After adding the at least one second anhydrous organic solvent, an insoluble portion of each of the one or more target impurities is separated, for example, filtered or cannulated, from the solution to produce a filtrate containing LiFSI in solution. The filtration may be performed using any suitable methods, such as using one or more filter media, centrifuging, gravity separation, hydrocycloning, etc. Those skilled in the art will understand the appropriate filtration technique(s) to use in any particular instantiation of a purification method of the present disclosure.

After obtaining the filtrate from the filtration, solvent in the filtrate is removed so as to obtain a solid mass consisting mainly of LiFSI and some reduced amount(s) of the one or more target impurities. The solvent removed will typically be each of the one or more first anhydrous organic solvents and the one or more second anhydrous organic solvents from previous processing. The solvent may be removed using any suitable techniques, such as under suitable temperature and reduced pressure conditions. For example, the removing of the solvent may be performed at a pressure of about 0.5 Torr or less or about 0.1 Torr or less. The temperature during the removal may be, for example, about 25° C. to about 40° C. or less.

After obtaining the solid mass, the solid mass may be contacted with at least one third anhydrous organic solvent, in which LiFSI is substantially insoluble, to further remove more of the one or more target impurities by the one or more target impurities solvating with the third solvent. Another benefit is to remove any ppm level of HF formed during the process, especially by evacuating the solvent at reduced pressure and a slightly higher temperature than room temperature. In some embodiments, the amount of the at least one third anhydrous organic solvent used to contact the solid mass may be at least 50 wt. % of the weight of the solid mass. Examples of anhydrous organic solvents from which each of the at least one third anhydrous organic solvent may be selected include, but are not necessarily limited to, dichloromethane, dichloroethane, chloroform, pentane, hexane, heptane, octane, nonane, decane, undecane, dodecane.

After contacting the solid mass with the at least one third anhydrous organic solvent, the LiFSI is isolated from the at least one third anhydrous organic solvent to obtain a purified LiFSI product that contains a reduced amount of each of the one or more target impurities. The isolating of the LiFSI from the at least one third anhydrous organic solvent may be performed using any one or more suitable techniques, such as filtering the LiFSI in solid form and/or drying the solid LiFSI, such as in vacuo. In some embodiments, the in-vacuo pressure is less than about 0.1 Torr or less than about 0.01 Torr. The resulting purified LiFSI product is typically a white free-flowing powder.

The dried purified LiFSI product may be stored in a dry inert container, such as a dry polytetrafluoroethylene (PTFE) container or a nickel alloy that is inert to free fluoride, at a reduced temperature, such as about 25° C. or below, and within an inert gas, such as argon, to inhibit degradation of the LiFSI during storage.

The following Table I illustrates an example of selecting each of a first, second, and third anhydrous organic solvent for an LiFSI purification method of the present disclosure. As seen in the Table, the selected first anhydrous organic solvent is dimethyl carbonate and the selected second and third anhydrous organic solvent is dichloromethane.

TABLE I

Example Solvent Solubilities for LiFSI and Example Target Impurities.

| Compound | $1^{st}$ Organic Solvent Solvent/Solubility | $2^{nd}$ & $3^{rd}$ Organic Solvent (Insoluble) |
|---|---|---|
| LiSO$_2$FNSO$_2$F (LiFSI) | Dimethyl carbonate >90% | Dichloromethane |
| Li$_2$SO$_4$ (lithium sulfate) | Dimethyl carbonate <5 ppm | Dichloromethane |
| LiF (lithium fluoride) | Dimethyl carbonate <13 ppm | Dichloromethane |
| LiCl (lithium chloride) | Dimethyl carbonate <5 ppm | Dichloromethane |

Based on the Table I above, the solubility of LiFSI in dimethyl carbonate is >90%, and it is insoluble in dichloromethane. On the other hand, the solubility of target impurities, such as the LiF, LiCl, and Li$_2$SO$_4$ in this example, is less than 13 ppm in dimethyl carbonate under an anhydrous condition. Therefore, anhydrous dimethyl carbonate and anhydrous dichloromethane solvents have been chosen in this example of purifying crude LiFSI to obtain a purified LiFSI product in accordance with the present disclosure. In accordance with aspects of the methods described above, crude LiFSI containing impurities reported in the Table I above, may be mixed in dimethyl carbonate in about 40% to about 75% concentration at around 25° C. and stirred at room temperature followed by addition of dichloromethane about 2% to about 10% to precipitate the target impurities. The target impurities may then be removed, for example, by filtration, and the filtrate may be concentrated to dryness. The obtained solid may then be treated with anhydrous dichloromethane to remove any target HF impurity, which is soluble in dichloromethane. However, LiFSI is insoluble in dichloromethane.

Purified LiFSI may be recovered by filtration and finally dried at reduced pressure (in one example, at less than about 0.1 Torr) and at less than about 40° C. to achieve a white free-flowing powder. In this example, the white powder was stored under argon atmosphere in a PTFE container.

Depending on the concentration(s) of the target impurity(ies) in the crude LiFSI being purified using any one of the above methodologies and on the desired maximum concentration(s) of one or more of those target impurities in the desired purified LiFSI product, it may be necessary to perform a multi-pass method to sequentially reduce the amount(s) of the one or more target impurities with each pass. Such a multi-pass method may utilize any one or more of the foregoing methodologies in series to continually reduce the level of each of one or more target impurities initially in the crude LiFSI and then that may still be remaining in the resulting purified LiFSI product. An example multi-pass purification method 100 of the present disclosure is illustrated in FIG. 1.

Figure 3:
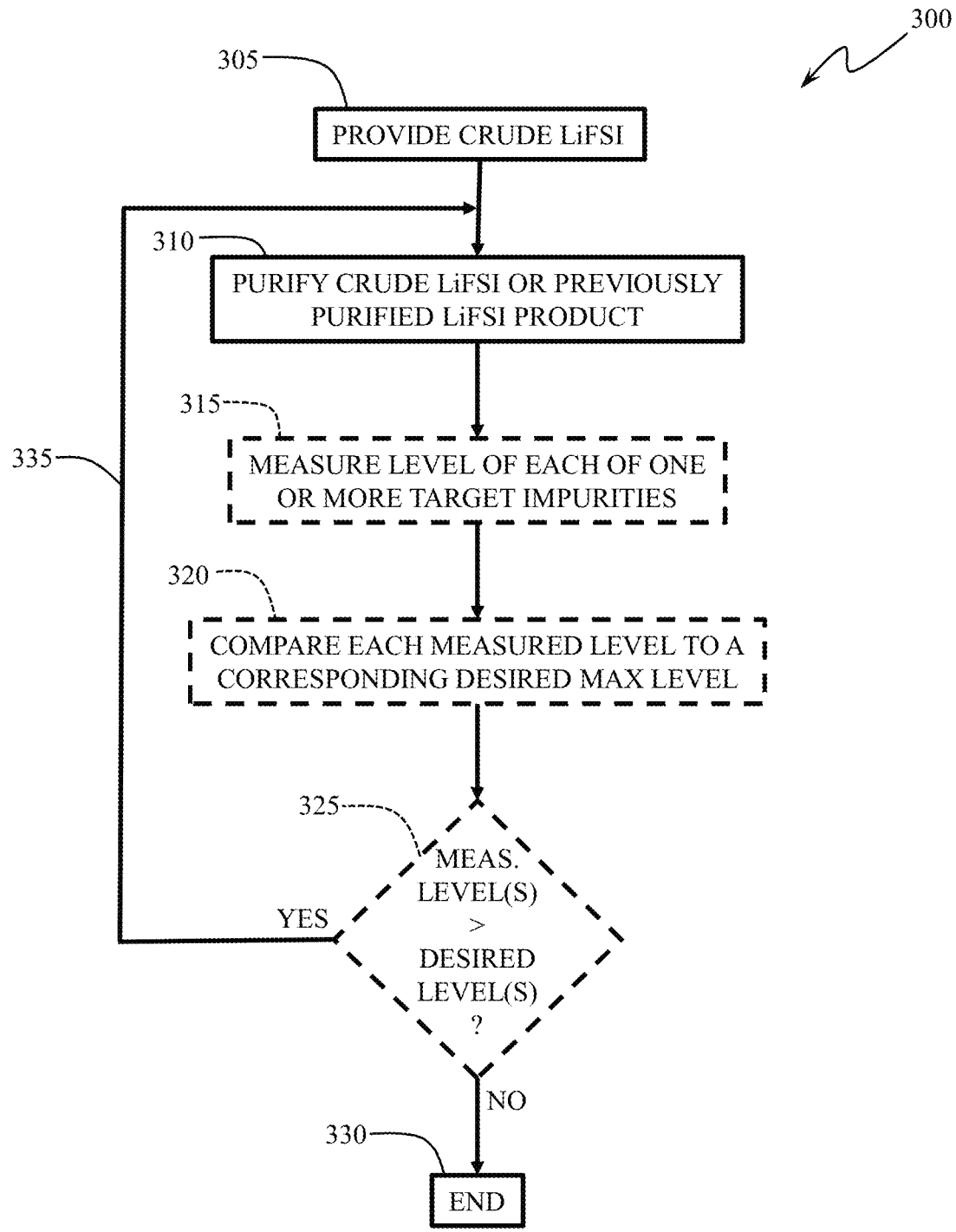
FIG. 3 is a flow diagram illustrating a multi-pass method of purifying LiFSI in accordance with aspects of the present disclosure.

Referring to FIG. 3, at block 305, a crude LiFSI containing one or more target impurities present at certain level(s) is provided. At block 310, the crude LiFSI is purified using any one of the methodologies described above. An end result of the purification at block 310 is a purified LiFSI product in which the level of each target impurity has been reduced. At optional block 315, the level of each of one or more of the target impurities in the purified LiFSI product is measured using a suitable measurement procedure. At optional block 320, each of the measured levels is compared to a maximum desired level for the corresponding target impurity that is acceptable to be in the purified LiFSI product. At optional block 325, it is determined whether any one or more of the measured levels exceeds the corresponding desired maximum level. If not, i.e., if each measured level is below the corresponding desired maximum level, then the purified LiFSI product meets the desired impurity-level specification and does not need further purification. Therefore, the multi-pass purification method 300 can end at block 330.

However, if at block 325 any one or more of the measured levels exceeds the corresponding desired maximum level(s), then the purified LiFSI product purified in the previous pass through purification at block 310 may be purified at block 310 via a loop 335. In this pass through purification at block 310, the anhydrous organic solvent(s) used for making the solution and/or washing the crystalized LiFSI may be the same or different as used in the previous pass through purification at block 310. At the end of purification at block 310, at optional blocks 315 and 320 one or more measurements of the target impurity level(s) and one or more comparisons of the measured level(s) to one or more corresponding desired maximum levels can be made to determine whether the method 300 can end at block 330 or the LiFSI in the purified LiFSI product of the most recent pass should be subjected to purification again via the loop 335.

A nonlimiting but illustrative example of where a multi-pass purification method could be useful is a lithium-based electrolyte, such as LiFSI, for a lithium-based battery. Crude LiFSI would typically have chloride impurities, such as LiCl from HCl synthesis impurities in crude HFSI used to make the LiFSI, on the order of 350 ppm or more. However, such chloride levels are corrosive to lithium-metal batteries. Consequently, it is desired to keep chloride levels in LiFSI-based electrolytes for lithium-metal batteries low, such as less than about 10 ppm or less than 1 ppm. Using a multi-pass purification methodology of the present disclosure, such as the multi-pass purification method 300 illustrated in FIG. 3, for crude LiFSI used to synthesize the LiFSI salt used in the electrolyte may be a useful way of achieving such low chloride levels.

As a non-limiting but illustrative example, multi-pass purification method 300 may be used to lower the chlorine (in the form of target impurity LiCl) content in an LiFSI product to below 1 ppm, starting with crude LiFSI containing 200 ppm of LiCl as a synthesis impurity. At block 305, a desired amount of the crude HFSI is provided. At block 310, the crude LiFSI is purified using any of the purification methodologies described above or exemplified below.

At optional block 315, the level of LiCl (or chlorides) in the purified LiFSI product are measured to be 100 ppm. At optional block 320, the measured level of 300 ppm is compared against the less-than-1 ppm requirement. At optional block 325, since 100 ppm is greater than the less-than-1 ppm requirement, the purified LiFSI product is processed at block 310, via loop 335, using the same or differing purification process as used to purify the initial crude LiFSI. In this second pass, the starting target impurity level is 100 ppm, and the ending impurity level in the twice-purified LiFSI product is now 20 ppm, as measured at optional block 315. After comparing this 20 ppm level to the less-than-1 ppm requirement at optional block 320, at optional block 325 it is determined that the twice-purified LiFSI product needs to be purified again at block 310, via loop 335, with the same or different purification method used in either of the two prior passes.

In this third pass, the starting target impurity level is 20 ppm, and the ending impurity level in the thrice-purified LiFSI product is now less than 1 ppm, as measured at optional block 315. After comparing this less-than-one ppm level to the less-than-1 ppm requirement at optional block 320, at optional block 325 it is determined that the thrice-purified LiFSI product satisfies the requirement such that multi-pass purification method 300 can end at block 330.

II.B. EXAMPLES

The above methodologies are further illustrated by the following examples, although it will be understood that these examples are included merely for purposes of illustration and are not intended to limit the scope of the present disclosure. Unless otherwise stated, all the chemicals used in these examples were of high purity and obtained from reputable commercial sources. Stringent precautions were taken to exclude moisture from the processes, and reactions were performed using well-ventilated hoods.

II.B.1. Example 1

Purification of LiFSI using dimethyl carbonate (DMC) and dichloromethane: In a 500 mL dry flask, crude LiFSI (250 g) containing various level of impurities, here, $FSO_3^-$=400 ppm, $Cl^-$=50 ppm, $F^-$=200 ppm, $SO_4^{2-}$=200 ppm, and water=200 ppm, was taken under a nitrogen atmosphere and cooled to 10° C. with a water bath. Anhydrous DMC (250 g (50 wt. %)) was added to the flask portion-wise with stirring, followed by an addition of 20 g (4 wt. %) of anhydrous dichloromethane. The mixture was stirred at room temperature for 1 hour. Insoluble impurities were removed from the mixture by filtration. The filtrate was concentrated at reduced pressure to obtain a solid, which was then treated with anhydrous dichloromethane (200 g) under argon. The mixture was stirred at room temperature for 1 hour, and the desired insoluble LiFSI product was isolated by filtration and finally dried at 35° C. in vacuo (<0.1 Torr) to obtain a purified LiFSI product in 95% yield. In this example, the purified LiFSI product had the following impurities: $FSO_3^-$=100 ppm; $Cl^-$=10 ppm; $F^-$=50 ppm; $SO_4^{2-}$=60 ppm; and water=50 ppm.

II.B.2. Example 2

Purification of LiFSI using ethyl methyl carbonate (EMC) and dichloromethane: In a 500 mL dry flask, crude LiFSI (250 g) with various level of impurities, here, $FSO_3^-$=200 ppm, $Cl^-$=10 ppm, $F^-$=100 ppm, $SO_4^{2-}$=100 ppm, and water=100 ppm, was taken under a nitrogen atmosphere and cooled to 10° C. with a water bath. Anhydrous EMC (200 g; (~44 wt. %)) was added to the flask portion-wise with stirring, followed by addition of 25 g (~5.6 wt. %) of anhydrous dichloromethane. The mixture was stirred at room temperature for 1 hour. Insoluble impurities were removed by filtration. The filtrate was concentrated at reduced pressure to obtain a solid, which was then treated with anhydrous dichloromethane (250 g) under argon. The mixture was stirred at room temperature for 1 hour, and the desired insoluble LiFSI product was isolated by filtration and finally dried at 35° C. in vacuo (<0.1 Torr) to obtain a purified LiFSI product in 92% yield. In this example, the purified LiFSI had the following impurities: $FSO_3^-$=40 ppm; $Cl^-$=1 ppm; $F^-$=10 ppm; $SO_4^{2-}$=20 ppm; and water=30 ppm.

II.B.3. Example 3

Purification of LiFSI using Diethyl carbonate (DEC) and dichloromethane: In a 500 mL dry flask, crude LiFSI (250 g) containing various level of impurities, here, $FSO_3^-$=400 ppm, $Cl^-$=50 ppm, $F^-$=200 ppm, $SO_4^{2-}$=200 ppm, and water=200 ppm, was taken under a nitrogen atmosphere and cooled to 10° C. with a water bath. Anhydrous DEC (250 g (50 wt. %)) was added to the flask portion-wise with stirring, followed by addition of 20 g (4 wt. %) of anhydrous dichloromethane. The mixture was stirred at room temperature for 1 hour. Insoluble impurities were removed from the mixture by filtration. The filtrate was concentrated at reduced pressure to obtain a solid, which was then treated with anhydrous dichloromethane (200 g) under argon. The mixture was stirred at room temperature for 1 hour, and the desired insoluble LiFSI product was isolated by filtration and finally dried at 35° C. in vacuo (<0.1 Torr) to obtain a purified LiFSI product in 90% yield. In this example, the purified LiFSI product has the following impurities: $FSO_3^-$=80 ppm; $Cl^-$=5 ppm; $F^-$=30 ppm; $SO_4^{2-}$=50 ppm; and water=45 ppm.

II.B.4. Example 4

Purification of LiFSI using dipropyl carbonate (DPC) and dichloromethane: In a 500 mL dry flask, crude LiFSI (250 g) containing various level of impurities, here, $FSO_3^-$=200 ppm, $Cl^-$=10 ppm, $F^-$=100 ppm, $SO_4^{2-}$=100 ppm, and water=100 ppm, was taken under a nitrogen atmosphere and cooled to 10° C. with a water bath. Anhydrous dipropyl carbonate (200 g (~44 wt. %)) was added to the flask portion-wise with stirring, followed by addition of 20 g (~4.4 wt. %) of anhydrous dichloromethane. The mixture was stirred at room temperature for 1 hour. Insoluble impurities were removed from the mixture by filtration. The filtrate was concentrated at reduced pressure to obtain a solid, which was treated with anhydrous dichloromethane (250 g) under argon. The mixture was stirred at room temperature for 1 hour, and the desired insoluble LiFSI product was isolated by filtration and finally dried at 35° C. in vacuo (<0.1 Torr) to obtain a purified LiFSI product in 90% yield. In this example, the purified LiFSI product had the following impurities: $FSO_3^-$=30 ppm; $Cl^-$=1 ppm; $F-$=11 ppm; $SO_4^{2-}$=15 ppm; and water=30 ppm.

II.B.5. Example 5

Purification of LiFSI using methyl propyl carbonate (MPC) and dichloromethane: In a 500 mL dry flask, crude LiFSI (250 g) containing various level of impurities, here, $FSO_3^-$=200 ppm, $Cl^-$=10 ppm, $F^-$=100 ppm, $SO_4^{2-}$=100 ppm, and water=100 ppm, was taken under a nitrogen atmosphere and cooled to 10° C. with a water bath. Anhydrous methyl propyl carbonate (MPC) (200 g (~44.4 wt. %)) was added to the flask portion-wise with stirring, followed by an addition of 20 g (~4.4 wt. %) of anhydrous dichloromethane. The mixture was stirred at room temperature for 1 hour. Insoluble impurities were removed by filtration. The filtrate was concentrated at reduced pressure to obtain a solid, which was treated with anhydrous dichloromethane (250 g) under argon. The mixture was stirred at room temperature for 1 hour, and the desired insoluble LiFSI product was isolated by filtration and finally dried at 35° C. in vacuo (<0.1 Torr) to obtain a purified LiFSI product in 91% yield. In this example, the purified LiFSI product had the following impurities: $FSO_3^-$=32 ppm; $Cl^-$=2 ppm; $F-$=12 ppm; $SO_4^{2-}$=22 ppm; and water=35 ppm.

II.B.6. Example 6

Purification of LiFSI using ethyl acetate and chloroform: In a 500 mL dry flask, crude LiFSI (250 g) containing various level of impurities, here, $FSO_3^-$=200 ppm, $Cl^-$=10 ppm, $F^-$=100 ppm, $SO_4^{2-}$=100 ppm, and water=100 ppm, was taken under nitrogen atmosphere and cooled to 10° C. with a water bath. Anhydrous ethyl acetate (150 g (37.5 wt. %)) is added to the flask portion-wise with stirring, followed by addition of 20 g (5 wt. %) of anhydrous chloroform. The mixture was stirred at room temperature for 1 hour. Insoluble impurities were removed by filtration. The filtrate was concentrated at reduced pressure to obtain a solid, which was treated with anhydrous chloroform (250 g) under argon. The mixture was stirred at room temperature for 1 hour, and the desired insoluble LiFSI product was isolated by filtration and finally dried at 35° C. in vacuo (<0.1 Torr) to obtain a purified LiFSI product in 88% yield. In this example, the purified LiFSI had the following impurities: $FSO_3^-$=40 ppm; $Cl^-$=2 ppm; $F-$=15 ppm; $SO_4^{2-}$=20 ppm; and water=40 ppm.

II.B.7. Example 7

Purification of LiFSI using butyl acetate and dichloromethane: In a 500 mL dry flask, crude LiFSI (200 g) containing various level of impurities, here, $FSO_3^-$=200 ppm, $Cl^-$=10 ppm, $F^-$=100 ppm, $SO_4^{2-}$=100 ppm, and water=100 ppm, was taken under nitrogen atmosphere and cooled to 10° C. with a water bath. Anhydrous butyl acetate (150 g (~43 wt. %)) was added to the flask portion-wise with stirring followed by addition of 30 g (~8.6 wt. %) of anhydrous dichloromethane. The mixture was stirred at room temperature for 1 hour. Insoluble impurities were removed by filtration. The filtrate was concentrated at reduced pressure to obtain a solid, which was treated with anhydrous dichloromethane (250 g) under argon. The mixture was stirred at room temperature for 1 hour, and the desired insoluble LiFSI product was isolated by filtration and finally dried at 35° C. in vacuo (<0.1 Torr) to obtain a purified LiFSI product in 89% yield. In this example, th purified LiFSI product had the following impurities: $FSO_3^-$=38 ppm; $Cl^-$=1 ppm; $F-$=15 ppm; $SO_4^{2-}$=22 ppm; and water=40 ppm.

II.B.8. Example 8

Purification of LiFSI using acetonitrile and dichloromethane: In a 500 mL dry flask, crude LiFSI (200 g) containing various level of impurities, here, $FSO_3^-$=200 ppm, $Cl^-$=10 ppm, $F^-$=100 ppm, $SO_4^{2-}$=100 ppm, and water=100 ppm, was taken under nitrogen atmosphere and cooled to 10° C. with water bath. Anhydrous butyl acetate (150 g (~43 wt. %)) was added in portion-wise with stirring followed by addition of 30 g (~8.6 wt. %) of anhydrous dichloromethane. The mixture was stirred at room temperature for 1 hour. Insoluble impurities were removed by filtration. The filtrate was concentrated at reduced pressure to obtain a solid, which was treated with anhydrous dichloromethane (250 g) under argon. The mixture was stirred at room temperature for 1 hour, and the desired insoluble LiFSI product was isolated by filtration and finally dried at 35° C. in vacuo (<0.1 Torr) to obtain a purified LiFSI product in 90% yield. In this example, the purified LiFSI had the following impurities: $FSO_3^-$=50 ppm; $Cl^-$=5 ppm; $F-$=20 ppm; $SO_4^{2-}$=22 ppm; and water=38 ppm.

II.C. EXAMPLE PURIFIED LiFSI PRODUCTS

Using any of the foregoing purification methodologies, such as any of the single-pass purification methodologies disclosed above or multi-pass methodology 300 of FIG. 3, the resulting purified LiFSI products can have exceptionally low levels of target impurities removed by the purification method. For example, a purified LiFSI product of the present disclosure in which at least one of the target impurities is LiCl can have an LiCl ($Cl^-$) level less than or equal to 10 ppm, or less than 1 ppm. As another example, a purified LiFSI product of the present disclosure in which at least one of the target impurities includes LiF (F), $FSO_3Li$ ($FSO_3^-$), and LiCl ($Cl^-$) can have: $F^-$ less than or equal to about 80 ppm, $FSO_3^-$ less than or equal to about 100 ppm, and $Cl^-$ less than about 100 ppm; $F^-$ less than or equal to about 40 ppm, $FSO_3^-$ less than or equal to about 250 ppm, and $Cl^-$ less than or equal to about 20 ppm; or $F^-$ less than or equal to about 200 ppm, $FSO_3^-$ less than or equal to about 100 ppm, and $Cl^-$ less than or equal to about 30 ppm. In another example, each of the foregoing levels of impurities and combinations thereof can be achieved starting with a crude LiFSI having about 200 ppm or more of $F^-$, about 200 ppm or more of $FSO_3^-$, and/or about 200 ppm or more of $Cl^-$. In yet another example, a purified LiFSI product of the present disclosure in which at least one of the target impurities is $SO_4^{2-}$ can have an $SO_4^{2-}$ level less than or equal to about 280 ppm, or less than or equal to about 100 ppm. In a further example, each of the foregoing $SO_4^{2-}$ levels can be achieved starting with a crude LiFSI having about 500 ppm or more of $SO_4^{2-}$. A useful feature of purification methods of the present disclosure is the ability to remove differing types of target impurities simultaneously with one another in each (or the only) pass through of the method.

II.D. EXAMPLE USES OF PURIFIED LiFSI PRODUCTS

As mentioned above, a purified LiFSI product may be used to make a purified LiFSI-based electrolyte for an electrochemical device, among other things. Here, the purity of the purified electrolyte flows from the fact that the purified LiFSI product has been purified in accordance with any one or more of the methods disclosed herein. Such purified electrolytes can be made using any of a variety of methods, such as by mixing a purified LiFSI product (salt) of the present disclosure with one or more solvents, one or more diluents, and/or one or more additives, which solvents, diluents, and additives may be known in the art.

As described above in section I.D.2., FIG. 2 illustrates an electrochemical device 200 made in accordance with aspects of the present disclosure. In this example, instead of reduced-reactive-solvent LiFSI-based electrolyte 216 described above, a purified LiFSI-based electrolyte 216A made in accordance with the present disclosure may be used. As described above, a benefit of using a purified LiFSI-based electrolyte of the present disclosure, purified to remove non-solvent impurities, for the purified LiFSI-based electrolyte 216A is that impurities that can be in LiFSI-based electrolytes, such as synthesis impurities, can be reduced to levels that are acceptable (e.g., meet one or more impurity level specifications) for use in the electrochemical device 200. Examples of purified LiFSI products (salts) and example low levels of their various impurities that can be used to make the purified LiFSI-based electrolyte 216A are described above.

In one example, the purified LiFSI-based electrolyte 216A may be made starting with a crude LiFSI, which is then purified using any one or more of the purification methods described herein to create a purified LiFSI product having suitable low levels of one or more target impurities. In an alternative example, crude HFSI may first be synthesized, such as by any of the synthesis methods described above, and this crude HFSI can be used to synthesize crude LiFSI. This crude LiFSI can be purified using any one or more of the purification methods described herein to create a purified LiFSI product (salt). This purified LiFSI product may then be used to make the purified LiFSI-based electrolyte 216A, for example, by adding one or more solvents, one or more diluents, and/or one or more additives that enhance the performance of the electrochemical device 200. The purified LiFSI-based electrolyte 216A may then be added to the electrochemical device 200, after which the container 220 may be sealed.

III. SYNTHESIZING LiFSI USING AN AQUEOUS NEUTRALIZATION PROCESS

This section addresses methods of synthesizing LiFSI using an aqueous neutralization process, LiFSI salts made thereby, and uses of such LiFSI salts.

III.A. EXAMPLE AQUEOUS NEUTRALIZATION SYNTHESIS METHODS

In the present disclosure, an LiFSI product (e.g., salt) may be obtained by first neutralizing a purified hydrogen bis (fluorosulfonyl)imide (HFSI) with one or more lithium bases, such as lithium carbonate ($Li_2CO_3$) or lithium hydroxide (LiOH), in deionized water may be carried out to give an aqueous solution of LiFSI. The insoluble impurities, such as the $Li_2SO_4$, LiCl, LiF, and $LiFSO_3$ mentioned above, can be removed by filtration. The water may be removed, for example, in vacuo. Purified HFSI for use in this process may be obtained in any suitable manner, such as by purifying HFSI by crystallization, for example, as described in U.S. patent application Ser. No. 16/570,131, filed on Sep. 13, 2019, and titled "Purified Hydrogen Bis(fluorosulfonyl) imide (HFSI) Products, Methods of Purifying Crude HFSI, and Uses of Purified HFSI Products", which is incorporated herein by reference for its teachings of purifying HFSI. Experimental examples of synthesizing LiFSI using aqueous neutralization and their corresponding resulting impurity levels are described below in Examples 1, 4, and 6 in, respectively, sections III.C.1, III.C.4, and III.C.6.

III.B. EXAMPLE PURIFICATION OF LiFSI SALT MADE USING AQUEOUS-BASE NEUTRALIZATION

A crude LiFSI product made using an aqueous neutralization process of section III.A, above, can be purified to remove one or more target impurities, such as any synthesis impurities remaining after the removal of water from the synthesized LiFSI product. In addition, or alternatively, a crude LiFSI product made using an aqueous neutralization process of section III.A, above, can be purified to remove and/or replace reactive solvent(s), such as water, present in the LiFSI product. This section briefly describes examples of purification of crude LiFSI made in accordance using an aqueous neutralization process.

III.B. 1. Removal of Non-Reactive-Solvent Impurities

As discussed above in section II.A, crude LiFSI, which includes a crude LiFSI product made using an aqueous neutralization process described above in section III.A, can be purified to remove target impurities. Such target impurities may include any synthesis salts, for example, $Li_2SO_4$, LiCl, LiF, and $LiFSO_3$ mentioned above in section III.A, that may remain after filtration of such insoluble salts and removal of water. As an example, after removal of the water from the aqueous neutralization process, the resulting LiFSI product (here, "crude LiFSI" for the context of purification in accordance with section II.A, above) can be subjected to the purification described above in section II.A. The resulting purified LiFSI product will have reduced levels of the impurity(ies) targeted. Experimental examples of such purification and corresponding target impurity levels are described below in Examples 2, 5, and 7 in, respectively, sections III.C.2, III.C.5, and III.C.7. When the purified LiFSI product is used to prepare an electrolyte solution, it is noted that the solvent(s) used in the purification process may be one or more of the solvent(s) used in the final electrolyte solution. In this manner, any solvent(s) remaining from the purification process will become part of the final electrolyte-solution solvent(s).

III.B.2. Removal/Replacement of Reactive Solvent(s)

As discussed above in section I.A, crude LiFSI, which includes a crude LiFSI product made using an aqueous neutralization process described above in section III.A, can be purified to remove/replace one or more reactive solvents.

Such reactive solvents may include any remaining water not removed in the water-removal step mentioned above in section III.A. In addition, one or more reactive solvents targeted for removal and/or replacement by one or more non-reactive solvents may be present after purification to remove non-reactive-solvent impurities as described above in sections III.B. 1 and II.A. As an example, after removal of the water from the aqueous neutralization process, the resulting LiFSI product (here, "crude LiFSI" for the context of purification in accordance with section I.A, above) can be subjected to the purification described above in section I.A. As another example, after purification (see section III.B. 1, above) of LiFSI synthesized according to an aqueous-neutralization process of section III.A, the resulting purified LiFSI product (here, "crude LiFSI" for the context of purification in accordance with section I.A, above) can be subjected to the purification described above in section I.A. In either case, the resulting purified LiFSI product will have reduced levels of the reactive solvent(s) targeted. Experimental examples of such purification and corresponding target impurity levels are described below in Examples 3 of sections III.C.3. When the purified LiFSI product is used to prepare an electrolyte solution, it is noted that the solvent(s) used in the reactive-solvent-removal/replacement process may be one or more of the solvent(s) used in the final electrolyte solution. In this manner, any solvent(s) remaining from the removal/replacement process will become part of the final electrolyte-solution solvent(s).

The crude LiFSI so obtained may be purified to remove one or more target impurities, such as synthesis impurities and/or other impurities, present in crude LiFSI. In some embodiments, the crude LiFSI may be mixed with minimum amount (e.g., about 50% to about 70% by weight) of one or more first anhydrous organic solvents in which LiFSI is soluble so as to leave impurities such as $Li_2SO_4$, LiCl, LiF, and $LiFSO_3$ further insoluble. Anhydrous organic solvents that can be used for this include dimethyl carbonate (DMC), diethyl carbonate (DEC), ethyl methyl carbonate (EMC), propyl methyl carbonate (PMC), ethylene carbonate (EC), fluoroethylene carbonate (FEC), trans butylene carbonate, acetonitrile, malononitrile, adiponitrile, methyl acetate, ethyl acetate, propyl acetate, butyl acetate, methyl propionate (MP), and ethyl propionate (EP).

To the above solution, one or more second anhydrous organic solvents in which LiFSI is insoluble is/are added (e.g., in an amount of about 2% to 10%, by weight). Organic solvents that can be used for this include dichloromethane, dichloroethane, chloroform, pentane, hexane, heptane, octane, nonane, decane, undecane, and dodecane.

In some embodiments, impurities remain precipitated after the addition of the one or more second anhydrous organic solvents and may be removed by filtration. The filtrate may be collected and the solvent(s) removed therefrom to obtain a solid. In some example, the solvent(s) is/are removed at controlled temperature (e.g., <about 40° C.) in vacuo (e.g., <about 0.1 Torr) to obtain the solid. The obtained solid may then be treated with at least one third anhydrous organic solvent in which LiFSI is insoluble. Organic solvents that can be used for this include dichloromethane, dichloroethane, chloroform, pentane, hexane, heptane, octane, nonane, decane, undecane, dodecane. The precipitated LiFSI salt product may then be isolated by filtration under an inert environment, (e.g., argon gas) and dried, for example, at <about 40° C. in vacuo (e.g., <about 0.1 Torr).

For illustration, Table II, below, provides a detailed example of impurities and their solubility in dimethyl carbonate and dichloromethane.

TABLE II

Solubility of LiFSI, $Li_2SO_4$, LiF, LiCl in dimethyl carbonate and dichloromethane at room temperature.

| Compounds | Soluble | Insoluble |
| --- | --- | --- |
| $LiSO_2NSO_2F$ (LiFSI) | Dimethyl carbonate >90% | Dichloromethane |
| $Li_2SO_4$ (lithium sulfate) | Dimethyl carbonate <5 ppm | Dichloromethane |
| LiF (lithium fluoride) | Dimethyl carbonate <13 ppm | Dichloromethane |
| LiCl (lithium chloride) | Dimethyl carbonate <5 ppm | Dichloromethane |

As seen in the foregoing Table II above, solubility of LiFSI in dimethyl carbonate is >90%, and it is insoluble in dichloromethane. On the other hand, the solubility of impurities such as LiF, LiCl, and $Li_2SO_4$ is less than 13 ppm in dimethyl carbonate under anhydrous condition.

Based on these solubility/insolubility properties, dimethyl carbonate and dichloromethane solvents are chosen in one example for the process of purifying the crude LiFSI made using the aqueous-based neutralization process described above. In this example, the crude LiFSI containing impurities reported in Table II, above, was mixed in dimethyl carbonate in 50% to 75% concentration at around 25° C. (here, room temperature) and stirred at room temperature followed by addition of dichloromethane about 2% to about 10%, by weight, to precipitate impurities. The impurities were removed by filtration, and the filtrate was concentrated to dryness. The resulting dry solid was treated with anhydrous dichloromethane to remove any HF impurities, which are soluble in dichloromethane while LiFSI is insoluble in dichloromethane.

An ultrapure LiFSI salt product was recovered by filtration and finally dried at reduced pressure (e.g., <about 0.1 Torr) and at a temperature of <about 40° C. to achieve a white free-flowing powder, which may optionally be stored in dry polytetrafluoroethylene (PTFE) container.

In view of the foregoing, in some aspects the present disclosure describes a process for producing ultrapure lithium bis(fluorosulfonyl)imide (LiFSI) for lithium metal anode battery applications. The process comprises neutralizing a purified hydrogen bis(fluorosulfonyl)imide (HFSI) with lithium bases, such as, for example, lithium carbonate ($Li_2CO_3$) or lithium hydroxide (LiOH), in less than about 40% deionized water below about 25° C. The insoluble impurities, such as $Li_2SO_4$, LiCl, LiF, and $LiFSO_3$, may be removed by filtration. The water may be removed in vacuo (e.g., <about 0.1 Torr) at a suitable temperature, such as below about 35° C.

The obtained crude LiFSI may be mixed with a minimum amount (e.g., 50% to 70% by weight) of anhydrous organic solvent (such as, for example, dimethyl carbonate (DMC) or ethyl methyl carbonate (EMC)) in which LiFSI is soluble so as to leave impurities such as LiCl, LiF, $Li_2SO_4$, and/or LiF $SO_3$, further insoluble. In some embodiments, the temperature of the solution is maintained at less than about 25° C. The solution may then be filtered in inert atmosphere to remove impurities.

The process may further comprise removing the organic solvents from the filtrate to get solid mass and treating the solid with organic solvent (e.g., dichloromethane) wherein the lithium bis(fluorosulfonyl)imide is insoluble. The insoluble LiFSI may be isolated by filtration in inert atmosphere and flushing the traces of organic solvent with dry argon and/or nitrogen gas. The obtained LiFSI may be evacuated (e.g., at less than about 0.1 Torr) at a suitable temperature (e.g., less than about 35° C.) for a suitable period of time (e.g., at least 24 hours) to achieve an ultrapure anhydrous LiFSI salt product as white free-flowing powder, which may optionally be stored in dry polytetrafluoroethylene (PTFE) container.

In some embodiments, an LiFSI salt product synthesized by the disclosed aqueous neutralization method, purified to remove non-reactive-solvent impurities, and purified to remove/replace reactive solvent(s) may be made into an electrolyte solution and used in a lithium-metal battery, i.e., a battery having a lithium-metal anode. As illustrated below in Example 8 of section III.C.8, this "ultrapure" LiFSI salt product and electrolytes made therewith have shown much better cycle life compared to LiFSI from commercial sources such as Nippon Shokubai Co., Ltd. (Japan), Shenzhen Capchem Co., Ltd. (China), Shang Hai Shengzhan Chemifish Co., Ltd. (China), and Oakwood Products, Inc. (USA).

In the present disclosure, the production process of ultrapure LiFSI can be a continuous process starting from the beginning neutralization to the end of producing the ultrapure LiFSI product.

III. C. EXAMPLES

Aspects of the present disclosure are further illustrated by the following examples, although it will be understood that these examples are included merely for purposes of illustration and are not intended to limit the scope of the disclosure. Unless otherwise stated, all the chemicals used were of high purity and obtained from the commercial sources. Stringent precautions were taken to exclude the moisture in the process and reactions were performed in well ventilated hoods.

III.C.1. Example 1

Neutralization of purified HFSI with Lithium Carbonate in deionized water: In 1000 mL flask, Lithium carbonate ($Li_2CO_3$), 1 mole was mixed with 40 g of deionized water. The suspension is cooled with ice water bath <20° C. Hydrogen bis(fluorosulfonyl)imide (HFSI), 2 mole was taken in a dropping funnel and added dropwise in the stirred slurry of Lithium carbonate suspension. After complete addition of HFSI, the water bath was removed, and the solution was stirred at room temperature for 0.5 h. Insoluble impurities were removed by filtration. The obtained clear filtrate was concentrated in vacuo at <0.1 Torr and at <35° C. to get crude LiFSI, in quantitative yield, that was used in Example 2, below.

III.C.2. Example 2

Treating crude LiFSI with Dimethyl Carbonate: The crude LiFSI obtained in Example 1, above, was used in this Example 2. The flask was taken under nitrogen atmosphere and cooled to 10° C. with water bath. Anhydrous dimethyl carbonate (DMC) (300 g) is added in portion-wise with stirring followed by addition of 50 g of anhydrous dichloromethane. The mixture was stirred at room temperature for 1 h. Insoluble impurities were removed by filtration. The filtrate was concentrated at reduced pressure to get a solid, which was treated with anhydrous dichloromethane (200 g) under argon. The mixture was stirred at room temperature for 1 h, and the desired insoluble LiFSI product was isolated by filtration and finally dried <35° C. in vacuo (<0.1 Torr) to get LiFSI in 95% yield. The obtained LiFSI product had the impurities $FSO_3^-$=100 ppm, $Cl^-$=1 ppm, $F^-$=40 ppm, $SO_4^{2-}$=40 ppm, water=50 ppm.

III.C.3. Example 3

Treating LiFSI with Dimethyl Carbonate: The LiFSI obtained in Example 2 was used in this Example 3. 200 g LiFSI obtained in Example 2, above, was taken in the glove box having water reading <1 ppm and transfer in a 1 L dry flask. The flask was taken out and cooled with water bath <15° C. The LiFSI was mixed with 100 g of anhydrous dimethyl carbonate containing water <5 ppm. The insoluble impurities were removed by filtration under argon and filtrate was collected in a 1 L flask. The filtrate was concentrated at reduced pressure <0.1 Torr to get a solid. The solid was treated with anhydrous dichloromethane (150 g) under argon, and the solution was stirred at room temperature for 1 h. The desired insoluble LiFSI product was isolated by filtration and dried at 30° C. in vacuo (<0.1 Torr) to get a white free flowing powder LiFSI in 95% yield. The obtained LiFSI product had the impurities $F^-$=1.3 ppm, $Cl^-$=0.18 ppm, and $SO_4^{2-}$=4.4 ppm, as analyzed by Ion chromatography. The water content was 1.3 ppm, as analyzed by Karl Fisher. Based on proton NMR, it has 0.2% dimethyl carbonate. Dimethyl carbonate was used in a test electrolyte formulation, as it is non-reactive with lithium metal within an electrochemical device. This salt electrolyte formulation was used in lithium metal battery testing.

III.C.3.i. Comparative Example

Comparative example of LiFSI salt obtained from Capchem (China): By visual inspection, the color of the Capchem LiFSI salt was less white than the LiFSI obtained in this Example 3. The Capchem LiFSI salt had the following impurities: water=15 ppm; $F^-$=1 ppm; $Cl^-$=1 ppm; and $SO_4^{2-}$=5.98 ppm. Based on proton NMR, the Capchem LiFSI salt contained 0.3% ethanol, which is not compatible with lithium metal because of its reactivity. Ethanol reacts with lithium metal by the following reaction to form undesirable byproducts:

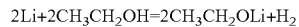

$2Li+2CH_3CH_2OH=2CH_3CH_2OLi+H_2$

III.C.4 Example 4

Neutralization of purified HFSI with Lithium Hydroxide in Dionized Water: In a 1 L flask, lithium hydroxide (LiOH), 2 mole, was dissolved in 40 g of deionized water. The suspension was cooled with ice water bath <20° C. HFSI, 2 mole, was taken in a dropping funnel and added dropwise in the stirred slurry of lithium carbonate suspension. After complete addition of HFSI, the water bath was removed, and the solution was stirred at room temperature for 0.5 h. Insoluble impurities were removed by filtration. The obtained clear filtrate was concentrated in vacuo at <0.1 Torr and temperature <35° C. to get crude LiFSI in quantitative yield, which was used in the following Example 5.

III.C.5 Example 5

Treating crude LiFSI with Dimethyl Carbonate (DMC): The crude LiFSI obtained in Example 4, above, was used in this Example 5. The flask was taken under nitrogen atmosphere and cooled to 10° C. with s water bath. Anhydrous dimethyl carbonate (DMC) (300 g) was added in, portionwise, with stirring followed by the addition of 50 g of anhydrous dichloromethane. The solution was stirred at room temperature for 1 h. Insoluble impurities were removed by filtration. The filtrate was concentrated at reduced pressure to obtain a solid, which was treated with anhydrous dichloromethane (200 g) under argon. The mixture was stirred at room temperature for 1 h and the desired insoluble LiFSI product was isolated by filtration and finally dried at 35° C. in vacuo (<0.1 Torr) to gat LiFSI in 92% yield. The obtained purified LiFSI had the impurities $FSO_3^-$=100 ppm, $Cl^-$=1 ppm, F-=45 ppm, $SO_4^{2-}$=35 ppm, water=60 ppm.

III.C.6. Example 6

Neutralization of purified HFSI with LithiumCarbonate in Dionized Water: In a 1 L flask, lithium carbonate ($Li_2CO_3$), 0.5 mole, was mixed with 20 g of deionized water. The suspension was cooled with ice water bath <20° C. HFSI, 1 mole, was taken in a dropping funnel and added dropwise in the stirred slurry of lithium carbonate suspension. After complete addition of the HFSI, the water bath was removed, and the solution was stirred at room temperature for 0.5 h. Insoluble impurities were removed by filtration. The obtained clear filtrate was concentrated in vacuo at <0.1 Torr and temperature <35° C. to get crude LiFSI in quantitative yield, which was used in Example 7, below.

III.C.7. Example 7

Treating Crude LiFSI with Ethyl Methyl Carbonate: The crude LiFSI obtained in Example 6 was used in this Example 7. The flask was cooled was taken under nitrogen atmosphere and cooled to 10° C. with water bath. Anhydrous ethyl methyl carbonate (EMC) (100 g) was added in portionwise with stirring, followed by addition of 50 g of anhydrous dichloromethane. The solution was stirred at room temperature for 1 h. Insoluble impurities were removed by filtration. The filtrate was concentrated at reduced pressure to get a solid, which was treated with anhydrous dichloromethane (200 g) under argon. It was stirred at room temperature for 1 h, and the desired insoluble LiFSI product was isolated by filtration and finally dried at 35° C. in vacuo (<0.1 Torr) to gat LiFSI in 90% yield. Purified LiFSI product had the impurities $FSO_3^-$=100 ppm, $Cl^-$=0.5 ppm, F-=20 ppm, $SO_4^{2-}$=20 ppm, water=46 ppm.

III.C.8. Example 8

Use of Ultrapure LiFSI of Example 7, above, in Lithium-metal Anode Batteries and Comparing the Results with Commercially Sourced LiFSI: Battery-grade electrochemically stable organic solvents (such as dimethyl carbonate, ethyl methyl carbonate, dimethoxy methane, diethoxy ethane) were used to make the electrolyte of the obtained LiFSI of present disclosure, and a comparative study was made using various commercially sourced LiFSI salts and corresponding electrolytes under similar conditions.

An ultrapure LiFSI product made in accordance with the present disclosure gave the largest number of cycles in lithium metal anode battery cells when compared to commercially sourced LiFSI from Capchem, Nippon Shokubai, Chemfish, and Oakwood. An example of the better performance of the ultrapure LiFSI product of the present disclosure appears in FIGS. 4A and 4B, which show, respectively, discharge capacity versus cycle number and capacity retention versus cycle number for two non-aqueous electrolytes having the same concentrations and identical chemistries, except that one of the electrolytes was made using an ultrapure LiFSI salt product made using an aqueous-neutralization-synthesis method of section III of the present disclosure (upper lines in each of FIGS. 4A and 4B; "SES LiFSI") and the other electrolyte was made using an LiFSI salt sourced from Capchem (lower lines in each of FIGS. 4A and 4B; "CapChem LiFSI").

Figure 4A:
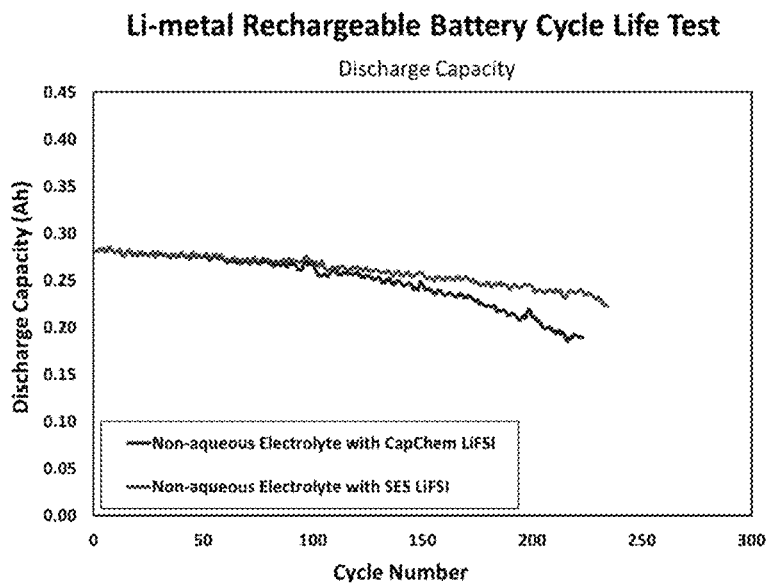
FIG. 4A is a graph of discharge capacity versus cycle number for a non-aqueous electrolyte utilizing LiFSI salt synthesized in accordance with aspects of this disclosure (upper line) and a like non-aqueous electrolyte utilizing a commercially purchased LiFSI salt (lower line)
Figure 4B:
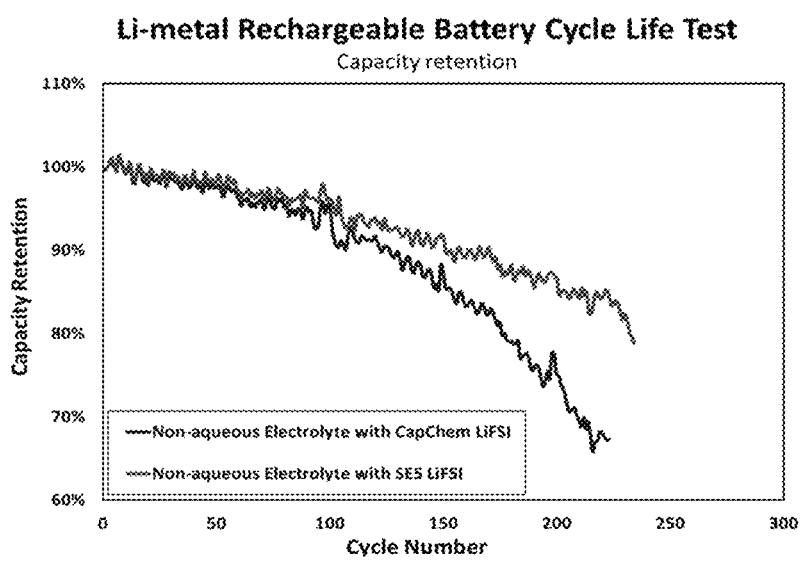
FIG. 4B is a graph of capacity retention versus cycle number for a non-aqueous electrolyte utilizing LiFSI salt synthesized in accordance with aspects of this disclosure (upper line) and a like non-aqueous electrolyte utilizing a commercially purchased LiFSI salt (lower line).

The battery cells used in experiments that resulted in the graphs of FIGS. 4A and 4B were pouch cells having 3 layers of cathode and 4 layers of anode. The electrolytes were each composed of 2.0 mole LiFSI in 1 liter of a solvent mixture. Except for the source of the LiFSI salt, all other cell design factors and testing conditions were the same. The cells were cycled under 0.2 C rate charging and 1.0 C rate discharging. As FIGS. 4A and 4B show, cells with LiFSI from both sources delivered the same capacity in early cycles. However, the cell with electrolyte made using the ultrapure LiFSI salt of the present disclosure exhibited better capacity retention than the cell with the Capchem LiFSI salt after about 100 cycles. This data indicate the stability advantage of ultrapure LiFSI salt over the Capchem LiSFI salt under long term cycling conditions with lithium metal anode rechargeable batteries.

III.D. EXAMPLE USES OF ULTRAPURE LiFSI

As noted above, an ultrapure LiFSI salt product made in accordance with the processes described above can be particularly beneficial to lithium-metal batteries having lithium-metal anodes. In this connection, it is important to select the appropriate anhydrous organic solvents for the processing, since at least some solvent may remain in the ultrapure LiFSI product and, if reactive to lithium metal, may interfere with the performance of the lithium-metal batteries in which the ultrapure LiFSI product is used as an electrolyte. Indeed, remnant solvent in the Capchem LiFSI salt, such as the ethanol reported in Example 3, above, may be a reason that the performance of that Capchem LiFSI salt was inferior to the performance of the ultrapure LiFSI salt product as evidenced in Example 8 (section III.C.8), above. As noted in the foregoing Example 3 (section III.C.3), ethanol is reactive to lithium metal that is present on/in the anode of a lithium-metal battery.

Consequently, when making an ultrapure LiFSI salt product for a lithium-metal battery in accordance with the present disclosure, the solvents selected should be solvents known to be non-reactive to lithium metal. In this manner, any solvent that may remain in the final dry solid ultrapure LiFSI salt product (e.g., by coordination with the LiFSI or otherwise), is non-reactive to lithium-metal and therefore less likely to be detrimental to the performance of the lithium-metal battery in which the ultrapure LiFSI salt product is used. As used herein and in the appended claims, unless otherwise noted the term "non-reactive" when used to modify "solvent" or "solvents" shall mean that the solvent(s) is/are non-reactive to lithium metal. Conversely, and unless otherwise noted, the term "reactive" used herein and in the appended claims to modify "solvent" or "solvents" shall mean that the solvent(s) is/are reactive to lithium metal. As those skilled in the art will appreciate, "reactive" in this context refers to the magnitude of the reduction potential of lithium metal relative to the solvent(s). Reactive solvent is also not effective in passivating lithium metal, while non-reactive solvent is either non-reactive towards lithium metal or effectively passivates the lithium metal, i.e., is kinetically stable.

In some embodiments particularly suited for use in lithium-metal batteries, the amount of reactive solvent(s) remaining in the final ultrapure LiFSI salt product (i.e., after complete processing and/or purification as disclosed herein) is preferably less than about 500 ppm, more preferably less than about 100 ppm, and most preferably less than about 50 ppm. In some embodiments and depending on the overall cathode-electrolyte-anode system utilized, non-reactive solvent remaining in the final LiFSI salt product may be less detrimental to battery performance than the removed reactive solvent. In such embodiments, the amount of non-reactive solvent(s) remaining in the final LiFSI salt product is preferably less than about 3000 ppm, more preferably less than about 2000 ppm, and most preferably less than about 500 ppm. In some embodiments and also depending on the overall cathode-electrolyte-anode system utilized, non-reactive solvent remaining in the final LiFSI salt product may be beneficial to battery performance, such as when the non-reactive solvent(s) used is/are intentionally selected to provide one or more benefits to the cathode-electrolyte-anode system, such as improved SEI formation and/or improved ion availability within the electrolyte. In some embodiments and as needed, additional amounts of the non-reactive solvent(s) used during purification and/or reactive-solvent removal/replacement may be added to make the final electrolyte. In embodiments in which the non-reactive solvent(s) used to process the LiFSI are beneficial to battery performance, the amount of non-reactive solvent remaining can be greater than 2000 ppm or greater than 3000 ppm. When purification is performed using only non-reactive solvents for all of the purification steps, the final LiFSI salt product will typically have at least about 100 ppm of non-reactive solvent(s) but will typically have no more than about 100 ppm of reactive solvent(s). Examples of non-reactive solvents that can be suitable to remain in the LiFSI salt following removal/replacement of reactive solvent(s) in accordance with the present disclosure include hexane, hydrocarbons, toluene, xylene, aromatic solvents, esters, and nitriles.

As described above in section I.D.2., FIG. 2 illustrates an electrochemical device 200 made in accordance with aspects of the present disclosure. In this example, instead of reduced-reactive-solvent LiFSI-based electrolyte 216 described above, an ultrapure LiFSI-based electrolyte 216B made in accordance with the section III may be used. As described above, a benefit of using an ultrapure LiFSI-based electrolyte of the present disclosure for the purified LiFSI-based electrolyte 216B is that impurities that can be in LiFSI-based electrolytes, such as synthesis impurities and reactive-solvent(s), can be reduced to levels that are acceptable (e.g., meet one or more impurity level specifications) for use in the electrochemical device 200. Examples of ultrapure LiFSI products (salts) and example low levels of their various impurities that can be used to make the purified LiFSI-based electrolyte 216B are described above. This ultrapure LiFSI product may then be used to make the ultrapure LiFSI-based electrolyte 216B, for example, by adding one or more solvents, one or more diluents, and/or one or more additives that enhance the performance of the electrochemical device 200. The ultrapure LiFSI-based electrolyte 216B may then be added to the electrochemical device 200, after which the container 220 may be sealed.

In view of the desire to eliminate as much reactive solvent(s) from the final ultrapure LiFSI salt product in lithium-metal battery applications, the purification methodologies disclosed herein may be augmented with the selecting of one or more solvents known to be non-reactive with respect to lithium metal for the appropriate step(s) of the methodology being used to perform the purification.

In some aspects, the present disclosure is directed to a method of creating a reduced-reactive-solvent lithium bis (fluorosulfonyl) imide (LiFSI) product, the method comprising: providing a first crude LiFSI containing LiFSI and one or more reactive solvents; contacting the first crude LiFSI with at least one first anhydrous organic solvent under an inert condition to create a solution containing the first crude LiFSI and the one or more reactive solvents, wherein the solubility of the LiFSI in the at least one first anhydrous organic solvent is at least about 35% below 25° C.; subjecting the solution to a vacuum so as to remove the at least one first anhydrous organic solvent and the one or more reactive solvents and obtain a solid mass; treating the solid mass with at least one second anhydrous organic solvent in which the LiFSI is insoluble to create a combination having an insoluble portion; isolating the insoluble portion in an inert atmosphere; flushing the insoluble portion with at least one dry inert gas so as to remove traces of the at least one second anhydrous organic solvent; and subjecting the flushed insoluble portion to a pressure of less than about 100 Torr so as to obtain the reduced-reactive-solvent LiFSI product.

In one or more embodiments of the method, wherein providing the first crude LiFSI includes: providing a second crude LiFSI containing LiFSI and one or more target impurities; contacting the second crude LiFSI with at least one third anhydrous organic solvent under inert conditions to create a solution containing LiFSI and the one or more target impurities, wherein the LiFSI is soluble and each of the one or more target impurities is substantially insoluble in the at least one third anhydrous organic solvent at room temperature; adding at least one fourth anhydrous organic solvent to the solution so as to precipitate the at least one target impurity, wherein each of the LiFSI and the one or more target impurities is substantially insoluble in the at least one fourth anhydrous organic solvent; filtering from the solution an insoluble portion of each of the one or more target impurities so as to produce a filtrate; removing solvent from the filtrate so as to obtain a solid mass; contacting the solid mass with at least one fifth anhydrous organic solvent in which the LiFSI is substantially insoluble; and isolating the LiFSI from the at least one fifth anhydrous organic solvent to obtain the first crude LiFSI.

In one or more embodiments of the method, wherein the second crude LiFSI has a solubility in the at least one third anhydrous organic solvent of at least about 50% at room temperature, and each of the one or more target impurities has a solubility in the at least one third anhydrous organic solvent that is no more than about 20 parts per million (ppm) at room temperature.

In one or more embodiments of the method, wherein contacting the second crude LiFSI with at least one third anhydrous organic solvent includes contacting the second crude LiFSI with a minimum amount of the at least one third anhydrous organic solvent.

In one or more embodiments of the method, wherein the minimum amount of the at least one third anhydrous organic solvent is about 40 wt. % to about 75 wt. % of the solution.

In one or more embodiments of the method, wherein adding at least one fourth anhydrous organic solvent to the solution includes adding the at least one fourth anhydrous organic solvent in an amount that is no more than about 10 wt. % of the solution.

In one or more embodiments of the method, wherein the contacting of the second crude LiFSI with the at least one third anhydrous organic solvent is performed at a temperature below about 25° C.

In one or more embodiments of the method, further comprising controlling a temperature of the solution during the contacting of the second crude LiFSI with the at least one third anhydrous organic solvent so as to maintain the temperature within about 2° C. of a target temperature.

In one or more embodiments of the method, wherein the filtering is performed in an inert atmosphere.

In one or more embodiments of the method, wherein the inert atmosphere comprises argon gas.

In one or more embodiments of the method, wherein removing solvent is performed in vacuo.

In one or more embodiments of the method, wherein removing solvent is performed at a pressure of about 0.1 Torr or less.

In one or more embodiments of the method, wherein removing solvent is performed at a temperature of less than about 40° C.

In one or more embodiments of the method, wherein isolating the LiFSI includes filtering the LiFSI in solid form from the at least one fifth anhydrous organic solvent.

In one or more embodiments of the method, wherein isolating the LiFSI includes drying the solid LiFSI in vacuo.

In one or more embodiments of the method, wherein drying the solid LiFSI in vacuo includes drying the solid LiFSI at a pressure of about 0.1 Torr or less.

In one or more embodiments of the method, wherein the one or more target impurities includes one or more target impurities from the group consisting of lithium chloride (LiCl), lithium fluoride (LiF), lithium sulfate ($Li_2SO_4$), lithium fluorosulfate ($LiSO_3$), hydrogen fluoride (HF), and fluorosulfonic acid ($FSO_3H$).

In one or more embodiments of the method, wherein the one or more target impurities include lithium sulfate ($Li_2SO_4$); and filtering an insoluble portion of each of the one or more target impurities includes simultaneously filtering an insoluble portion of the $Li_2SO_4$.

In one or more embodiments of the method, wherein the at least one third anhydrous organic solvent includes at least one solvent selected from the group consisting of dimethyl carbonate (DMC), diethyl carbonate (DEC), ethyl methyl carbonate (EMC), propyl methyl carbonate (PMC), ethylene carbonate (EC), fluoroethylene carbonate (FEC), trans butylene carbonate, acetonitrile, malononitrile, adiponitrile, methyl acetate, ethyl acetate, propyl acetate, butyl acetate, methyl propionate (MP), ethyl propionate (EP), methanol, ethanol, propanol, isopropanol.

In one or more embodiments of the method, wherein contacting the second crude LiFSI with at least one third anhydrous organic solvent includes contacting the second crude LiFSI with an amount of the at least one third anhydrous organic solvent that is about 50 wt. % to about 75 wt. % of the solution.

In one or more embodiments of the method, wherein adding at least one fourth anhydrous organic solvent to the solution includes adding the at least one fourth anhydrous organic solvent in an amount that is no more than about 10 wt. % of the solution.

In one or more embodiments of the method, wherein the at least one fourth anhydrous organic solvent includes at least one solvent selected from the group consisting of dichloromethane, dichloroethane, chloroform, pentane, hexane, heptane, octane, nonane, decane, undecane, dodecane.

In one or more embodiments of the method, wherein adding at least one fourth anhydrous organic solvent to the solution includes adding the at least one fourth anhydrous organic solvent in an amount that is no more than about 10 wt. % of the solution.

In one or more embodiments of the method, wherein the at least one fifth anhydrous organic solvent includes at least one solvent selected from the group consisting of dichloromethane, dichloroethane, chloroform, pentane, hexane, heptane, octane, nonane, decane, undecane, dodecane.

In one or more embodiments of the method, wherein the at least one fourth anhydrous organic solvent includes at least one solvent selected from the group consisting of dichloromethane, dichloroethane, chloroform, pentane, hexane, heptane, octane, nonane, decane, undecane, dodecane.

In one or more embodiments of the method, wherein the at least one fifth anhydrous organic solvent includes at least one solvent selected from the group consisting of dichloromethane, dichloroethane, chloroform, pentane, hexane, heptane, octane, nonane, decane, undecane, dodecane.

In one or more embodiments of the method, further comprising placing the first crude LiFSI in a dry atmosphere within a container that is substantially non-reactive with free fluorine and storing the container at a temperature of less than about 25° C.

In one or more embodiments of the method, wherein the one or more target impurities are byproducts of a process of synthesizing the LiFSI in the second crude LiFSI.

In one or more embodiments of the method, wherein the first crude LiFSI contains 10 parts per million (ppm) or less of LiCl.

In one or more embodiments of the method, wherein the first crude LiFSI contains less than 1 ppm of LiCl.

In one or more embodiments of the method, wherein the first crude LiFSI contains about 500 parts per million (ppm) or less of $FSO_3Li$, about 100 ppm or less of LiCl, and about 150 ppm or less of LiF.

In one or more embodiments of the method, wherein providing the second crude LiFSI includes synthesizing the second crude LiFSI using an aqueous-based neutralization process.

In one or more embodiments of the method, wherein providing the first crude LiFSI includes synthesizing the first crude LiFSI using an aqueous-based neutralization process.

In one or more embodiments of the method, wherein the reduced-reactive-solvent LiFSI product is a salt for an electrolyte for a lithium-metal battery and the method further comprises selecting each of the at least one first anhydrous organic solvents to enhance performance of the lithium-metal battery.

In one or more embodiments of the method, further comprising selecting each of the at least one second anhydrous organic solvent to enhance performance of the lithium-metal battery.

In one or more embodiments of the method, wherein the reduced-reactive-solvent LiFSI product is a salt for an electrolyte containing an additive solvent, wherein at least one of the at least first anhydrous solvents is the same as the additive solvent.

In some aspects, the present disclosure is directed to a method of making an electrochemical device, the method comprising: processing lithium bis(fluorosulfonyl)imide (LiFSI) salt using any of the methods recited herein, to create a purified LiFSI salt; formulating an electrolyte using the purified LiFSI salt; providing an electrochemical device structure that includes a positive electrode, a negative electrode spaced from the positive electrode, and a volume that extends between the positive and negative electrodes and, when the electrolyte is present therein allows ions in the electrolyte to move between the positive and negative electrodes; and adding the electrolyte to the volume.

In one or more embodiments of the method, wherein the electrochemical device is an electrochemical battery, and the electrochemical device structure further includes a separator located within the volume.

In one or more embodiments of the method, wherein the electrochemical battery is a lithium-ion battery.

In one or more embodiments of the method, wherein the electrochemical battery is a lithium-metal battery.

In one or more embodiments of the method, wherein the electrochemical devices is a supercapacitor.

In some aspects, the present disclosure is directed to an electrochemical device, comprising: a positive electrode; a negative electrode spaced from the positive electrode; a porous dielectric separator located between the positive and negative electrodes; and an electrolyte contained within at least the porous dielectric separator, the electrolyte made using an LiFSI salt made using of any one of the methods recited herein.

In one or more embodiments of the electrochemical device, wherein the electrochemical device is a lithium battery.

In one or more embodiments of the electrochemical device, wherein the electrochemical device is a lithium-metal secondary battery.

In one or more embodiments of the electrochemical device, wherein the electrochemical device is a supercapacitor.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of creating a reduced-reactive-solvent lithium bis(fluorosulfonyl) imide (LiFSI) product, the product comprising:
    providing a first crude LiFSI containing LiFSI and one or more reactive solvents coordinated to the LiFSI;
    contacting the first crude LiFSI with at least one first anhydrous organic solvent under an inert condition to create a solution containing the first crude LiFSI and one or more reactive solvents, wherein the solubility of the LiFSI in the at least one first anhydrous organic solvent is at least about 35% below 25° C., wherein the at least one anhydrous organic solvent is non-reactive solvent selected to replace at least a portion of the coordinated reactive solvent molecules bonded to ions from the crude LiFSI in the solution;
    subjecting the solution a vacuum so as to remove the at least one first anhydrous organic solvent and at least a portion of the one or more reactive solvents to obtain a solid mass;
    treating the solid mass with at least one second anhydrous organic solvent in which the LiFSI is insoluble so as to remove at least a portion of any coordinated portion of the at least one first anhydrous organic solvent remaining in the solid mass after the subjecting the solution to the vacuum to create a combination having an insoluble portion;
    isolating the insoluble portion in an inert atmosphere;
    flushing the insoluble portion with at least one dry inert gas so as to remove traces of the at least one second anhydrous organic solvent; and
    subjecting the flushed insoluble portion to a pressure of less than about 100 Torr so as to obtain the reduced-reactive-solvent LiFSI product.

2. The method of claim 1, wherein contacting the first crude LiFSI with at least one first anhydrous organic solvent includes contacting the first crude LiFSI with an amount of the at least one first anhydrous organic solvent, relative to solution, that is in a range of about 30 wt. % to about 50 wt. %.

3. The method of claim 2, wherein the at least one first anhydrous organic solvent is selected from a group consisting of organic carbonates, nitriles, alkyl acetates, and alkyl propionates.

4. The method of claim 2, wherein the at least one first anhydrous organic solvent is selected from the group consisting of dimethyl carbonate (DMC), diethyl carbonate (DEC), ethyl methyl carbonate (EMC), propyl methyl carbonate (PMC), ethylene carbonate (EC), fluoroethylene carbonate (FEC), trans butylene carbonate, acetonitrile, malononitrile, adiponitrile, methyl acetate, ethyl acetate, propyl acetate, butyl acetate, methyl propionate (MP) and ethyl propionate (EP).

5. The method of claim 4, wherein the at least one first anhydrous organic solvent includes DMC.

6. The method of claim 1, wherein the at least one first anhydrous organic solvent is selected from a group consisting of organic carbonates, nitriles, alkyl acetates, and alkyl propionates.

7. The method of claim 6, wherein treating the solid mass with at least one second anhydrous organic solvent includes treating the solid mass with at least one second anhydrous organic solvent selected from a group consisting of dichloromethane, dichloroethane, chloroform, pentane, hexane, heptane, octane, nonane, decane, undecane, and dodecane.

8. The method according to claim 7, wherein the at least one second anhydrous organic solvent includes dichloromethane.

9. The method of claim 1, wherein the at least one first anhydrous organic solvent is selected from the group consisting of dimethyl carbonate (DMC), diethyl carbonate (DEC), ethyl methyl carbonate (EMC), propyl methyl carbonate (PMC), ethylene carbonate (EC), fluoroethylene carbonate (FEC), trans butylene carbonate, acetonitrile, malononitrile, adiponitrile, methyl acetate, ethyl acetate, propyl acetate, butyl acetate, methyl propionate (MP) and ethyl propionate (EP).

10. The method of claim 9, wherein the at least one first anhydrous organic solvent includes DMC.

11. The method of claim 9, wherein treating the solid mass with at least one second anhydrous organic solvent includes treating the solid mass with at least one second anhydrous organic solvent selected from a group consisting of dichloromethane, dichloroethane, chloroform, pentane, hexane, heptane, octane, nonane, decane, undecane, and dodecane.

12. The method of claim 11, wherein the at least one second anhydrous organic solvent includes dichloromethane.

13. The method of claim 12, wherein the at least one first anhydrous organic solvent includes DMC.

14. The method of claim 9, wherein the dry inert gas comprises at least one of argon and nitrogen.

15. The method of claim 9, wherein subjecting the solution to a vacuum includes subjecting the solution to a vacuum of less than about 1 Torr.

16. The method of claim 15, wherein subjecting the solution to a vacuum includes subjecting the solution to a vacuum of less than about 0.01 Torr.

17. The method of claim 11, wherein the temperature during the vacuum is less than 35° C.

18. The method of claim 1, wherein treating the solid mass with at least one second anhydrous organic solvent includes treating the solid mass with at least one second anhydrous organic solvent selected from a group consisting of dichloromethane, dichloroethane, chloroform, pentane, hexane, heptane, octane, nonan, decane, undecane, and dodecane.

19. The method of claim 1, wherein isolating the insoluble portion in an inert atmosphere includes filtering the insoluble portion from the combination.

20. The method of claim 15, wherein the inert atmosphere comprises a dry inert gas.

21. The method of claim 1, wherein flushing of the insoluble portion with at least one dry inert gas includes flushing the insoluble portion with at least one of argon gas and nitrogen gas.

22. The method of claim 1, wherein subjecting the flushed insoluble portion to a pressure of less than about 100 Torr includes subjecting the flushed insoluble portion to a pressure of less than about 1 Torr.

23. The method of claim 18, wherein the pressure is less than about 0.01 Torr.

24. The method of claim 18, wherein contacting the first crude LiFSI with at least one first anhydrous organic solvent includes contacting the first crude LiFSI with an amount of the at least one first anhydrous organic solvent, relative to the solution, that is in a range of about 30 wt. % to about 50 wt. %.

25. The method of claim 24, wherein subjecting the solution to a vacuum includes subjecting the solution to a vacuum of less than about 0.01 Torr at a temperature of less than about 35° C.

26. The method of claim 1, wherein subjecting the flushed insoluble portion to a pressure of less than about 100 Torr includes subjecting the flushed insoluble portion to a pressure of less than about 0.01 Torr at a temperature of less than about 40° C.

27. The method of claim 1, wherein the one or more reactive solvents in the first crude LiFSI includes an alcohol in a concentration of at least 2000 parts-per-million (ppm), and the alcohol in the reduced-reactive-solvent LiFSI product is less than about 50 ppm.

28. The method of claim 26, wherein the alcohol has a concentration of at least about 3000 ppm.

29. The method of claim 1, wherein the one or more reactive solvents in the First crude LiFSI includes water in an initial concentration, and the water in the reduced-reactive-solvent LiFSI product is no more than about 35% of the initial amount.

30. The method of claim 29, wherein the water in the reduced-reactive-solvent LiFSI product is no more than about 20% of the initial concentration.

* * * * *

UNITED STATES PATENT AND TRADEMARK OFFICE
CERTIFICATE OF CORRECTION

PATENT NO. : 10,967,295 B2
APPLICATION NO. : 16/685601
DATED : April 6, 2021
INVENTOR(S) : Rajendra P. Singh et al.

It is certified that error appears in the above-identified patent and that said Letters Patent is hereby corrected as shown below:

In the Claims

In Column 38, Line 7, Claim 1, the word "product" should be replaced with the word "method".

In Column 38, Line 13, Claim 1, the word "the" should be added following the word "and".

In Column 38, Line 17, Claim 1, the word "first" should be added following the word "one".

In Column 38, Line 17, Claim 1, "a" should be added following the word "is".

In Column 38, Line 21, Claim 1, the word "to" should be added following the word "solution".

In Column 38, Line 29, Claim 1, the word "of" should be added following the word "subjecting".

In Column 38, Line 42, Claim 2, the word "the" should be added following the word "to".

In Column 39, Line 44, Claim 18, the word "nonan" should be replaced with the word "nonane".

Signed and Sealed this
Twenty-sixth Day of April, 2022

Katherine Kelly Vidal
*Director of the United States Patent and Trademark Office*